(12) United States Patent
Kitagawa et al.

(10) Patent No.: US 11,736,049 B2
(45) Date of Patent: Aug. 22, 2023

(54) MOTOR CONTROLLER

(71) Applicant: Mitsubishi Electric Corporation, Tokyo (JP)

(72) Inventors: Jun Kitagawa, Tokyo (JP); Tatsuya Mori, Tokyo (JP); Hiroko Ikeda, Tokyo (JP); Haruna Koyama, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/761,813

(22) PCT Filed: Nov. 27, 2019

(86) PCT No.: PCT/JP2019/046290
§ 371 (c)(1),
(2) Date: Mar. 18, 2022

(87) PCT Pub. No.: WO2021/106095
PCT Pub. Date: Jun. 3, 2021

(65) Prior Publication Data
US 2022/0393627 A1 Dec. 8, 2022

(51) Int. Cl.
*H02P 1/32* (2006.01)
*H02P 3/20* (2006.01)
(Continued)

(52) U.S. Cl.
CPC ............ *H02P 21/22* (2016.02); *H02P 25/22* (2013.01)

(58) Field of Classification Search
CPC ................................ H02P 21/22; H02P 25/22
(Continued)

(56) References Cited

U.S. PATENT DOCUMENTS

| | | | |
|---|---|---|---|
| 2011/0080125 A1* | 4/2011 | Shimada | H02P 21/0003 318/400.09 |
| 2017/0237377 A1* | 8/2017 | Furukawa | H02P 29/028 318/564 |

(Continued)

FOREIGN PATENT DOCUMENTS

JP 2018-129995 A 8/2018

OTHER PUBLICATIONS

Extended European Search Report dated Dec. 20, 2022 in European Application No. 19954430.5.
(Continued)

*Primary Examiner* — Erick D Glass

(57) ABSTRACT

To provide a motor controller which can suppress occurrence of a torque difference between systems, even if a DC voltage difference occurs between systems, in the case where each system is provided with a DC power source. A motor controller is provided with a first controller that controls so that the first q-axis current detection value approaches the second q-axis current detection value or the second q-axis current command value obtained from the second controller, when determining that the first DC voltage is higher than the second DC voltage; and a second controller that controls so that the second q-axis current detection value approaches the first q-axis current detection value or the first q-axis current command value obtained from the first controller, when determining that the second DC voltage is higher than the first DC voltage.

8 Claims, 11 Drawing Sheets

(51) Int. Cl.
  *H02P 7/06* (2006.01)
  *H02P 21/22* (2016.01)
  *H02P 25/22* (2006.01)

(58) Field of Classification Search
  USPC .......................................................... 318/496
  See application file for complete search history.

(56) References Cited

U.S. PATENT DOCUMENTS

| | | |
|---|---|---|
| 2019/0256130 A1 | 8/2019 | Kuramitsu et al. |
| 2019/0359253 A1 | 11/2019 | Kuramatsu et al. |
| 2022/0200508 A1* | 6/2022 | Saha ....................... H02P 25/22 |

OTHER PUBLICATIONS

International Search Report of PCT/JP2019/046290 dated Feb. 10, 2020 [PCT/ISA/210].

* cited by examiner

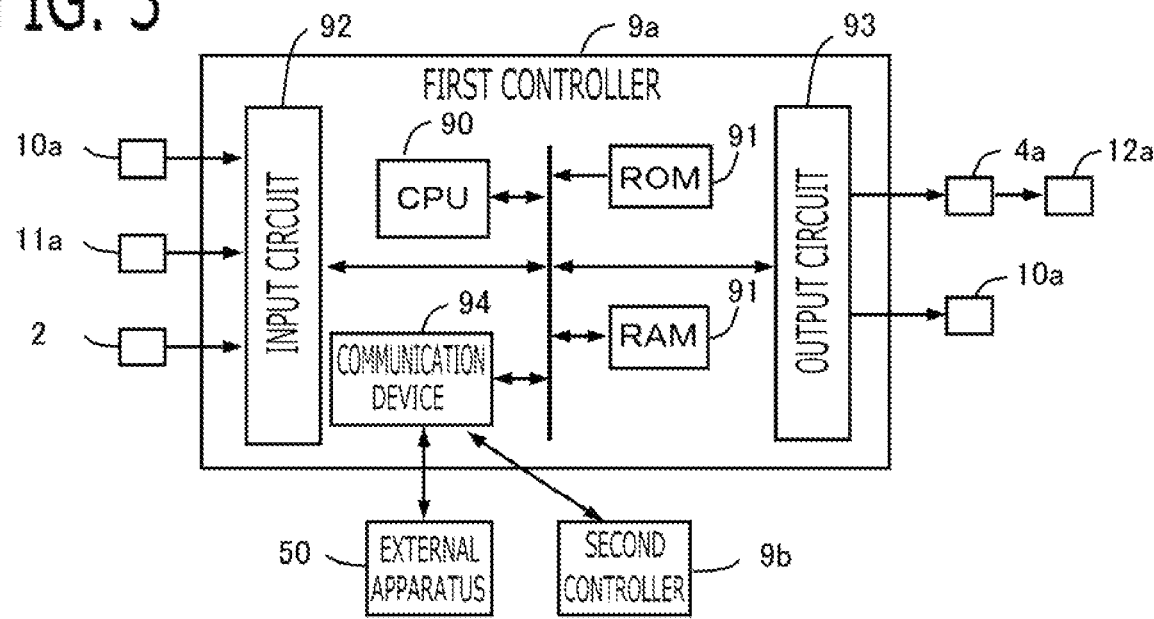
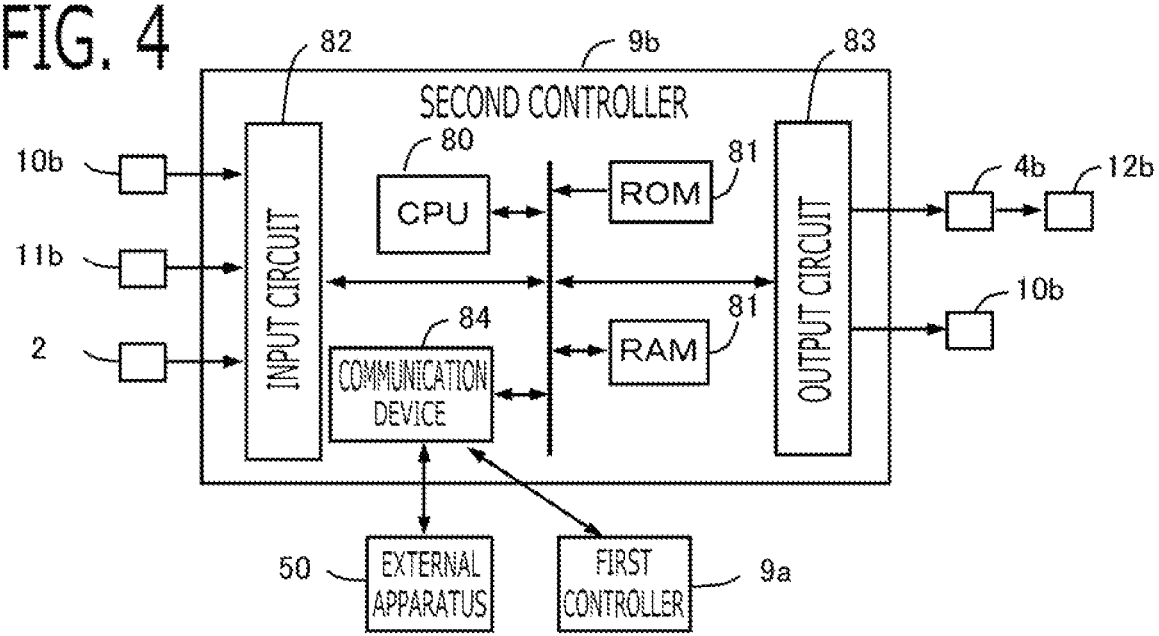

MOTOR CONTROLLER

CROSS REFERENCE TO RELATED APPLICATIONS

This application is a National Stage of International Application No. PCT/W2019/046290 filed on Nov. 27, 2019.

TECHNICAL FIELD

The present disclosure relates to a motor controller.

BACKGROUND ART

In the electric power steering, the redundant system which is provided with plural systems of the motor windings, the inverters, and the controllers has spread. In this system, even when failure occurs in any one system, other systems can continue operation.

In PLT 1, the controllers of plural systems are divided into one master side controller and other slave side controllers. The master side controller transmits the command value to the slave side. And, the slave side controller receives the command value from the master side, and performs current control based on the command value. In this method, since all controllers perform current control based on the command of the master side controller, the current values which flow through all motor windings ideally coincides.

CITATION LIST

Patent Literature

PLT 1: JP 2018-129995 A

SUMMARY OF INVENTION

Technical Problem

In the control method of PLT 1, the q-axis current command value is transmitted to the slave side second controller 230 from the master side first controller 130, and the same q-axis current command value is used between the first controller 130 and the second controller 230. At this time, by the current feedback control using control of the total current and the current difference, the current of the first three-phase winding and the current of the second three-phase winding can be approximately coincided.

When the voltage saturation that the induced voltage by the three-phase winding reaches the DC voltage of the DC power source occurs, and the q-axis current cannot follow the q-axis current command value, the magnitude of q-axis current changes in proportion to the magnitude of DC voltage. However, in the first inverter and the second inverter, the DC power sources may be individually provided for each system. In this case, due to the aging degradation of the DC power source, the decrease of charge amount, and the like, when the DC voltage of one DC power source decreases from the rated voltage, a DC voltage difference occurs between systems. In this condition, when it is operated in the operating condition where the voltage saturation occurs, even if the same q-axis current command values are set between systems, the difference of the q-axis currents between systems occurs due to the DC voltage difference between systems. Since the q-axis current of each system is proportional to the torque generated by the three-phase winding of each system, the torque difference between systems may occur due to the q-axis current difference between systems, and oscillation and noise of high frequency may be generated in the AC rotary machine.

Then, it is desired to provide a motor controller which can suppress occurrence of a torque difference between systems, even if a DC voltage difference occurs between systems, in the case where each system is individually provided with a DC power source.

Solution to Problem

A motor controller according to the present disclosure that controls an AC rotary machine which has a first three-phase winding and a second three-phase winding, the motor controller including:

a first inverter that applies a first DC voltage of a first DC power source to the first three-phase winding;

a first current detector that detects a current which flows through the first three-phase winding;

a first controller that calculates a first d-axis current detection value and a first q-axis current detection value which are expressed a current detection value of the first three-phase winding detected by the first current detector in a coordinate system of a d-axis and a q-axis which rotates synchronizing with a rotational position of the AC rotary machine; calculates a first d-axis current command value and a first q-axis current command value; calculates a first d-axis voltage command value and a first q-axis voltage command value; and controls the first inverter based on the first d-axis voltage command value and the first q-axis voltage command value;

a second inverter that applies a second DC voltage of a second DC power source to the second three-phase winding;

a second current detector that detects a current which flows through the second three-phase winding; and a second controller that calculates a second d-axis current detection value and a second q-axis current detection value which are expressed a current detection value of the second three-phase winding detected by the second current detector in the coordinate system of the d-axis and the q-axis; calculates a second d-axis current command value and a second q-axis current command value; calculates a second d-axis voltage command value and a second q-axis voltage command value; and controls the second inverter based on the second d-axis voltage command value and the second q-axis voltage command value, wherein when determining that the first DC voltage is less than or equal to the second DC voltage, the first controller changes the first q-axis voltage command value so that the first q-axis current detection value approaches the first q-axis current command value, and when determining that the first DC voltage is higher than the second DC voltage, the first controller changes the first q-axis voltage command value so that the first q-axis current detection value approach the second q-axis current detection value or the second q-axis current command value which are obtained from the second controller by communication, wherein when determining that the second DC voltage is less than or equal to the first DC voltage, the second controller changes the second q-axis voltage command value so that the second q-axis current detection value approaches the second q-axis current command value, and when determining that the second DC voltage is higher than the first DC voltage, the second controller changes the second q-axis voltage command value so that the second q-axis current detection value approaches the first q-axis current detection value or the first q-axis current command value which are obtained from the first controller by communication.

Advantage of Invention

According to the motor controller of the present disclosure, when the first DC voltage becomes higher than the second DC voltage, the second q-axis current detection value or the second q-axis current command value is set as the final first q-axis current command value, and the feedback control of the first q-axis current is performed. Therefore, in the vicinity of the operating condition where the voltage saturation occurs, the first q-axis current can be lowered to the second q-axis current so that the first q-axis current does not become higher than the second q-axis current. On the contrary, when the second DC voltage becomes higher than the first DC voltage, the first q-axis current detection value or the first q-axis current command value is set as the final second q-axis current command value, and the feedback control of the second q-axis current is performed. Therefore, in the vicinity of the operating condition where the voltage saturation occurs, the second q-axis current can be lowered to the first q-axis current so that the second q-axis current does not become higher than the first q-axis current. Since the q-axis current is proportional to the torque, it is possible to suppress occurrence of the torque difference between systems due to the difference of the DC voltage between systems.

BRIEF DESCRIPTION OF THE DRAWINGS

FIG. 3 is a hardware configuration diagram of the first controller according to Embodiment 1;
FIG. 4 is a hardware configuration diagram of the second controller according to Embodiment 1.

DETAILED DESCRIPTION OF THE EMBODIMENTS

1. Embodiment 1

Figure 1:
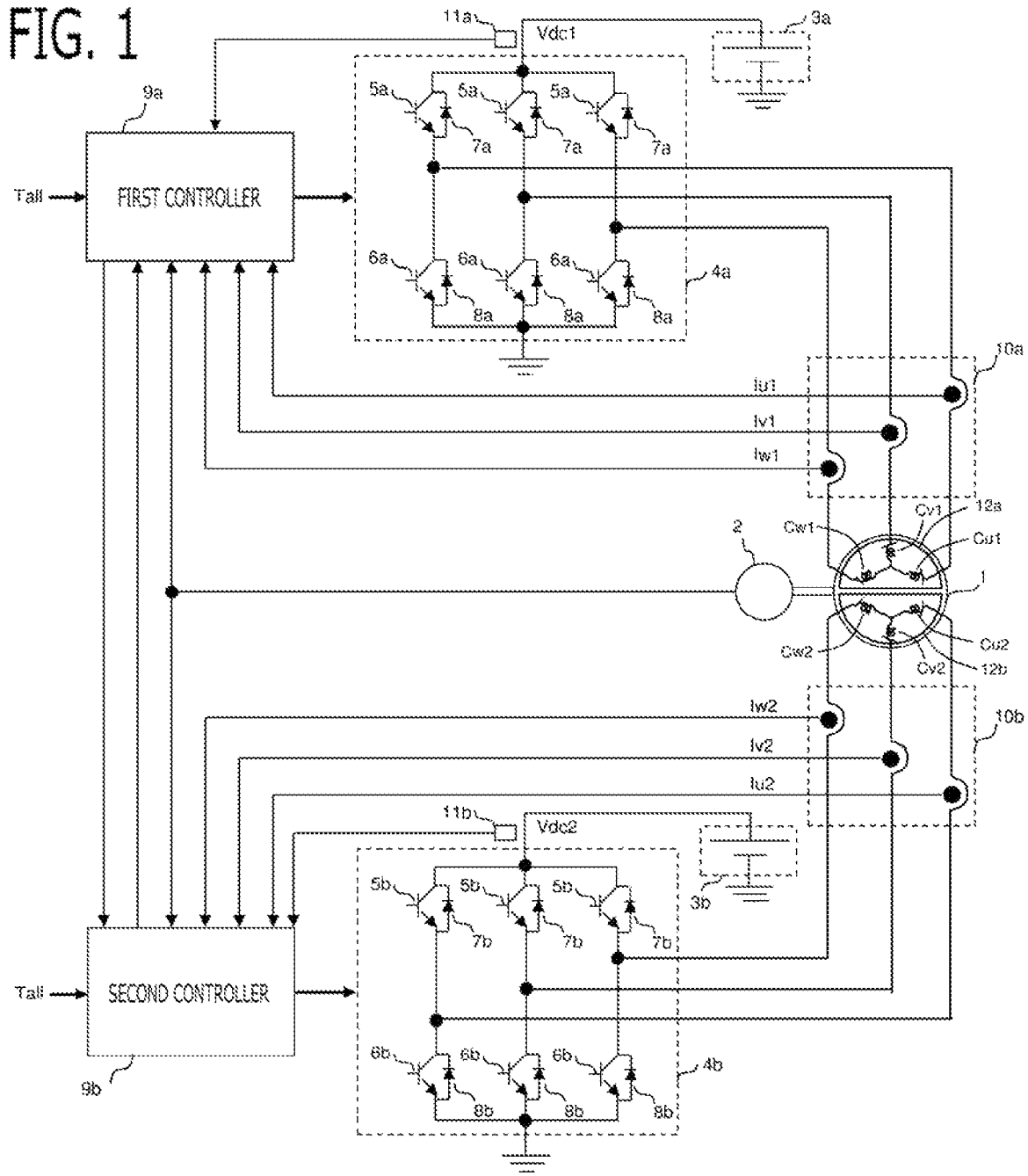
FIG. 1 is a schematic configuration diagram of the AC rotary machine and the motor controller according to Embodiment 1.

A motor controller which controls an AC rotary machine 1 according to Embodiment 1 will be explained with reference to drawings. FIG. 1 is a schematic configuration diagram of the AC rotary machine and the motor controller according to the present embodiment. The AC rotary machine 1 is provided with the first three-phase winding 12$a$ and the second three-phase winding 12$b$. A first system which applies voltage to the first three-phase winding 12$a$, and a second system which applies voltage to the second three-phase winding 12$b$ are provided independently. As the first system, the first inverter 4$a$, the first current detector 10$a$, the first controller 9$a$, the first DC power source 3$a$, and the first voltage detection circuit 11$a$ are provided. As the second system, the second inverter 4$b$, the second current detector 10$b$, the second controller 9$b$, the second DC power source 3$b$, and the second voltage detection circuit 11$b$ are provided.

1-1. AC Rotary Machine 1

The AC rotary machine 1 is provided with the first three-phase winding 12$a$ and the second three-phase winding 12$b$. The first three-phase winding 12$a$ is a winding Cu1 of U1 phase, a winding Cv1 of V1 phase, and a winding Cw1 of W1 phase. The second three-phase winding 12$b$ is a winding Cu2 of U2 phase, a winding Cv2 of V2 phase, and a winding Cw2 of W2 phase. Although each of the first and the second three-phase winding 12$a$, 12$b$ is connected by Y connection, but may be connected by Δ connection. The first and the second three-phase winding 12$a$, 12$b$ are wound around one stator. In the present embodiment, the first three-phase winding 12$a$ and the second three-phase winding 12$b$ are wound around the stator with a phase difference (angular difference) with each other.

The rotor is provided on the radial-direction inner side of the stator. The AC rotary machine 1 may be a permanent magnet synchronous rotary machine in which the permanent magnet is provided in the rotor, may be a winding field synchronous rotary machine in which the electromagnet is provided in the rotor, or may be an induction rotary machine or synchronous reluctance rotary machine in which the magnet is not provided in the rotor. In the example explained in the following, the permanent magnet is provided in the rotor.

A position detector 2 which detects a rotational position (a rotational angle) of the rotor is provided in the rotor. An output signal of the position detector 2 is inputted into the first controller 9$a$ and the second controller 9$b$. Various kinds of sensors are used for the position detector 2. For example, as the position detector 2, a position detector, such as a resolver, a Hall element, a TMR element, or a GMR element, or a rotation detector, such as an electromagnetic type, a magneto electric type, or a photoelectric type, is used.

1-2. First Inverter 4$a$

The first inverter 4$a$ is an electric power converter which applies the first DC voltage Vdc1 of the first DC power source 3$a$ to the first three-phase winding 12$a$. The first inverter 4$a$ has a plurality of switching devices.

The first inverter 4$a$ is provided with three sets of series circuits in each of which a positive electrode side switching device 5$a$ connected to the positive electrode terminal of the first DC power source 3$a$ and a negative electrode side switching device 6$a$ connected to the negative electrode terminal of the first DC power source 3$a$ are connected in series, corresponding to respective phase of the three-phase winding. A connection node of two switching devices in each series circuit is connected to the winding of the corresponding phase. IGBT (Insulated Gate Bipolar Transistor) in which a diode 7$a$, 8$a$ is connected in inverse parallel, MOSFET (Metal Oxide Semiconductor Field Effect Transistor) which has a function of diode connected in inverse parallel, or the like is used for the switching device. A gate terminal of each switching device 5a, 6a is connected to the first controller 9a via a gate drive circuit and the like. The each switching device is turned on or turned off by the switching signal outputted from the first controller 9a.

The first current detector 10a detects a current which flows into the winding of each phase of the first three-phase winding. The first current detector 10a is a Hall element or the like which is provided on the wire which connects the series circuit of the switching devices of each phase of the first inverter 4a, and the winding of each phase. The first current detector 10a may be a shunt resistance connected in series to the series circuit of the switching devices of each phase, or may be a shunt resistance connected in series to the connection line between the first inverter 4a and the first DC power source 3a.

The first DC power source 3a outputs a first DC voltage Vdc1 to the first inverter 4a. As the first DC power source 3a, any apparatus which outputs DC voltage, such as a battery, a DC-DC converter, a diode rectifier, and a PWM rectifier, is used.

A first voltage detection circuit 11a for detecting the first DC voltage Vdc1 is provided. An output signal of the first voltage detection circuit 11a is inputted into the first controller 9a.

1-3. Second Inverter 4b

The second inverter 4b is an electric power converter which applies the second DC voltage Vdc2 of the second DC power source 3b to the second three-phase winding 12b. The second inverter 4b is provided with a plurality of switching devices.

The second inverter 4b is provided with three sets of series circuits in each of which a positive electrode side switching device 5b connected to the positive electrode terminal of the second DC power source 3b and a negative electrode side switching device 6b connected to the negative electrode terminal of the second DC power source 3b are connected in series, corresponding to respective phase of the three-phase winding. A connection node of two switching devices in each series circuit is connected to the winding of the corresponding phase. IGBT in which the diode 7b, 8b is connected in inverse parallel, MOSFET which has a function of diode connected in inverse parallel, or the like is used for the switching device. A gate terminal of each switching device 5b, 6b is connected to the second controller 9b via a gate drive circuit and the like. The each switching device is turned on or turned off by the switching signal outputted from the second controller 9b.

The second current detector 10b detects a current which flows into the winding of each phase of the second three-phase winding. The second current detector 10b is a Hall element or the like which is provided on the wire which connects the series circuit of the switching devices of each phase of the second inverter 4b, and the winding of each phase. The second current detector 10b may be a shunt resistance connected in series to the series circuit of the switching device of each phase.

The second DC power source 3b outputs a second DC voltage Vdc2 to the second inverter 4b. As the second DC power source 3b, any apparatus which outputs DC voltage, such as a battery, a DC-DC converter, a diode rectifier, and a PWM rectifier, is used.

A second voltage detection circuit 11b for detecting the second DC voltage Vdc2 is provided. An output signal of the second voltage detection circuit 11b is inputted into the second controller 9b.

1-4. Basic Configuration of First Controller 9a

Figure 2:
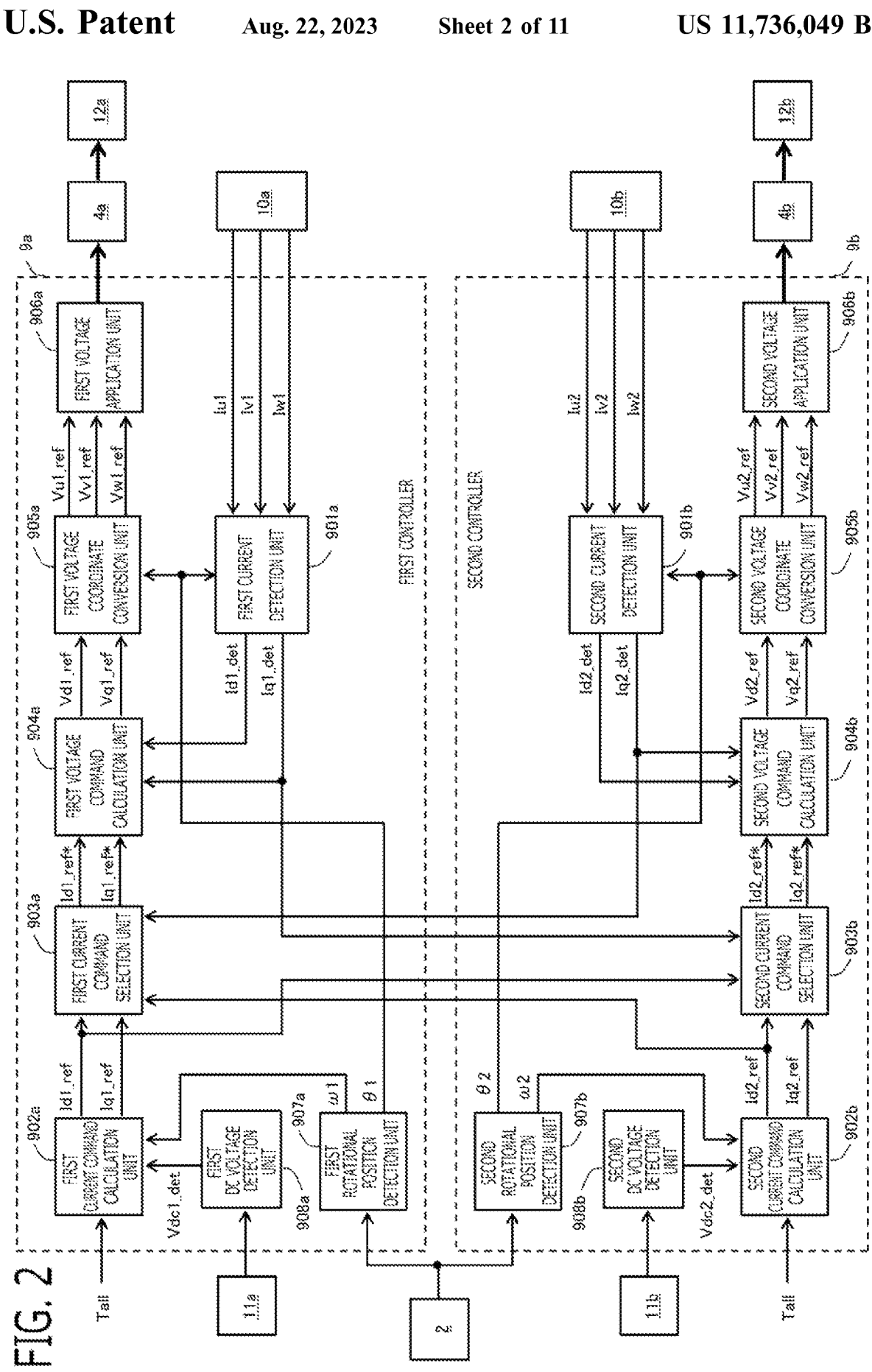
FIG. 2 is a block diagram of the first controller and the second controller according to Embodiment 1.

As shown in FIG. 2, the first controller 9a is provided with a first current detection unit 901a, a first current command calculation unit 902a, a first current command selection unit 903a, a first voltage command calculation unit 904a, a first voltage coordinate conversion unit 905a, a first voltage application unit 906a, a first rotational position detection unit 907a, a first DC voltage detection unit 908a, and the like.

Respective functional units 901a to 908a and the like provided in the first controller 9a are realized by processing circuits provided in the first controller 9a. Specifically, as shown in FIG. 3, the first controller 9a is provided with, as processing circuits, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, a communication device 94 which performs data communication with external apparatuses 50, and the second controller 9b. The first controller 9a transmits specific control information, such as the first q-axis current detection value Iq1_det and the first d-axis current command value Id1_ref, to the second controller 9b by the communication device 94.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatus 91, RAM (Random Access Memory), ROM (Read Only Memory), and the like are provided.

Various kinds of sensors, such as the position detector 2, the first current detector 10a, and the first voltage detection circuit 11a, are connected to the input circuit 92. The input circuit 92 is provided with an A/D converter and the like for inputting the output signals of sensors into the arithmetic processor 90. The output circuit 93 is connected with electric loads such as a gate drive circuit which drives on and off of the switching devices of the first inverter 4a, and is provided with driving circuit and the like for outputting a control signal from the arithmetic processor 90. The communication device 94 communicates with the external apparatus 50 and the second controller 9b.

Then, the computing processing unit 90 runs software items (programs) stored in the storage apparatus 91 such as a ROM and collaborates with other hardware devices in the first controller 9a, such as the storage apparatus 91, the input circuit 92, the output circuit 93, and the communication device 94, so that the respective functions of the functional units 901a to 908a included in the first controller 9a are realized. Setting data items such as a determination value to be utilized in the functional units 901a to 908a are stored, as part of software items (programs), in the storage apparatus 91 such as a ROM.

<First Rotational Position Detection Unit 907a>

The first rotational position detection unit 907a detects a rotational position θ1 (a magnetic pole position θ1, a rotational angle θ1) and a rotational angle speed ω1 in the electrical angle of the rotor, based on the output signal of the position detector 2.

<First DC Voltage Detection Unit 908a>

The first DC voltage detection unit 908a detects a first DC voltage Vdc1_det of the first DC power source 3a, based on the output signal of the first voltage detection circuit 11a.

<First Current Detection Unit 901a>

The first current detection unit 901a detects a U1 phase current Iu1_det, a V1 phase current Iv1_det, and a W1 phase current Iw1_det (referred to as first three-phase current detection values Iu1_det, Iv1_det, Iw1_det) which flow through each of the first three-phase winding Cu1, Cv1, Cw1, based on the output signal of the first current detector 10a. Then, the first current detection unit 901a calculates a first d-axis current detection value Id1_det and a first q-axis current detection value Iq1_det which are expressed in the coordinate system of the d-axis and the q-axis, by performing a three-phase/two-phase conversion and a rotating coordinate conversion to the first three-phase current detection values Iu1_det, Iv1_det, Iw1_det, based on the rotational position θ1.

The coordinate system of the d-axis and the q-axis (hereinafter, referred to as a dq-axis coordinate system) is a two-axis rotating coordinate system which rotates synchronizing with the rotational position θ1 (the magnetic pole position θ1) of the AC rotary machine (rotor). In detail, the dq-axis rotating coordinate system consists of the d-axis defined in the direction of the magnetic pole position θ1 (N pole of the magnet) of the rotor, and the q-axis defined in a direction advanced to the d-axis by 90 degrees in the electrical angle.

<First Current Command Calculation Unit 902a>

The first current command calculation unit 902a calculates a first d-axis current command value Id1_ref and a first q-axis current command value Iq1_ref. As shown in the next equation, the first current command calculation unit 902a calculates a first torque command value T1_ref, by multiplying a sharing rate K1 of the first three-phase winding to a torque command value Tall for making the AC rotary machine output. The sharing rate of first system K1 is set to a value smaller than 1 (for example, 0.5).

$$T1\_ref = K1 \times Tall \qquad (1)$$

The first current command calculation unit 902a calculates the first d-axis current command value Id1_ref and the first q-axis current command value Iq1_ref according to a current vector control method, such as the maximum torque/current control, the magnetic flux weakening control, and the Id=0 control, based on the first torque command value T1_ref, the first DC voltage Vdc1, the rotational angle speed ω1, and the like. In the present embodiment, the torque command value Tall is transmitted from the external apparatus 50. The torque command value Tall may be the first torque command value T1_ref after sharing. The torque command value Tall may be calculated in the first current command calculation unit 902a.

<First Voltage Command Calculation Unit 904a>

The first voltage command calculation unit 904a calculates a first d-axis voltage command value Vd1_ref and a first q-axis voltage command value Vq1_ref. In the present embodiment, the first voltage command calculation unit 904a performs a current feedback control which changes the first d-axis voltage command value Vd1_ref and the first q-axis voltage command value Vq1_ref, so that the first d-axis current detection value Id1_det approaches the first d-axis current command value after selection Id1_ref* by the first current command selection unit 903a described below, and the first q-axis current detection value Iq1_det approaches the first q-axis current command value after selection Iq1_ref* by the first current command selecting unit 903a. When calculating the d-axis and the q-axis voltage commands, the calculation for non-interfering between the d-axis current and the q-axis current of the first three-phase winding may be performed, and the calculation considering the interaction between the first three-phase winding and the second three-phase winding may be performed.

<First Voltage Coordinate Conversion Unit 905a>

The first voltage coordinate conversion unit 905a converts the first d-axis voltage command value Vd1_ref and the first q-axis voltage command value Vq1_ref into a first three-phase voltage command values Vu1_ref, Vv1_ref, Vw1_ref, by performing a fixed coordinate conversion and a two-phase/three-phase conversion based on the rotational position θ1 (the magnetic pole position θ1). Various kinds of modulation may be added to the three-phase voltage command values.

<First Voltage Application Unit 906a>

The first voltage application unit 906a turns on and off the plurality of switching devices of the first inverter 4a, by PWM (Pulse Width Modulation) control, based on the first three phase-voltage command values Vu1_ref, Vv1_ref, Vw1_ref. The first voltage application unit 906a generates a switching signal which turns on and off the switching device of each phase, by comparing each of the three-phase voltage command values and a carrier wave. The carrier wave is a triangular wave which has an amplitude of the first DC voltage detection value Vdc1_det, and oscillates at a carrier frequency. The first voltage application unit 906a turns on the switching signal when the voltage command value exceeds the carrier wave, and turns off the switching signal when the voltage command value is less than the carrier wave. The switching signal is transmitted as it is to the positive electrode side switching device 5a, and a switching signal obtained by reversing the switching signal is transmitted to the negative electrode side switching device 6a. Each switching signal is inputted into the gate terminal of each switching device of the first inverter 4a via the gate drive circuit, and each switching device is turned on or off.

1-5. Basic Configuration of Second Controller 9B

As shown in FIG. 2, the second controller 9b is provided with a second current detection unit 901b, a second current command calculation unit 902b, a second current command selection unit 903b, a second voltage command calculation unit 904b, a second voltage coordinate conversion unit 905b, a second voltage application unit 906b, a second rotational position detection unit 907b, a second DC voltage detection unit 908b, and the like.

Respective functional units 901b to 908b and the like provided in the second controller 9b are realized by processing circuits provided in the second controller 9b. Specifically, as shown in FIG. 4, the second controller 9b is provided with, as processing circuits, an arithmetic processor (computer) 80 such as a CPU, storage apparatuses 81 which exchange data with the arithmetic processor 80, an input circuit 82 which inputs external signals to the arithmetic processor 80, an output circuit 83 which outputs signals from the arithmetic processor 80 to the outside, a communication device 84 which performs data communication with external apparatuses 50, and the first controller 9a.

As the arithmetic processor 80, ASIC, IC, DSP, FPGA, various kinds of logical circuits, various kinds of signal processing circuits, and the like may be provided. As the arithmetic processor 80, a plurality of the same type ones or the different type ones may be provided, and each processing may be shared and executed. As the storage apparatuses 81, RAM, ROM, and the like are provided.

Various kinds of sensors, such as the position detector 2, the second current detector 10b, and the second voltage detection circuit 11b, are connected to the input circuit 82. The input circuit 82 is provided with an A/D converter and the like for inputting the output signals of sensors into the arithmetic processor 80. The output circuit 83 is connected with electric loads such as a gate drive circuit which drives on and off of the switching devices of the second inverter 4b, and is provided with driving circuit and the like for outputting a control signal from the arithmetic processor 80. The communication device 84 communicates with the external apparatus 50 and the first controller 9a. The second controller 9b transmits specific control information, such as the second q-axis current detection value Iq2_det and the second d-axis current command value Id2_ref, to the first controller 9a by the communication device 84.

Then, the computing processing unit 80 runs software items (programs) stored in the storage apparatus 81 such as a ROM and collaborates with other hardware devices in the second controller 9b, such as the storage apparatus 81, the input circuit 82, the output circuit 83, and the communication device 84, so that the respective functions of the functional units 901b to 908b included in the second controller 9b are realized. Setting data items such as a determination value to be utilized in the functional units 901b to 908b are stored, as part of software items (programs), in the storage apparatus 81 such as a ROM.

<Second Rotational Position Detection Unit 907b>

The second rotational position detection unit 907b detects a rotational position θ2 (a magnetic pole position θ2, a rotational angle θ2) and a rotational angle speed ω2 in the electrical angle of the rotor, based on the output signal of the position detector 2.

<Second DC Voltage Detection Unit 908b>

The second DC voltage detection unit 908b detects the second DC voltage Vdc2_det of the second DC power source 3b, based on the output signal of the second voltage detection circuit 11b.

<Second Current Detection Unit 901b>

The second current detection unit 901b detects a U2 phase current Iu2_det, a V2 phase current Iv2_det, and a W2 phase current Iw2_det (referred to as second three-phase current detection values Iu2_det, Iv2_det, Iw2_det) which flow through each of the second three-phase winding Cu2, Cv2, Cw2, based on the output signal of the second current detector 10b. The second current detection unit 901b calculates a second d-axis current detection value Id2_det and a second q-axis current detection value Iq2_det which are expressed in the coordinate system of the d-axis and the q-axis, by performing a three-phase/two-phase conversion and a rotating coordinate conversion to the second three-phase current detection values Iu2_det, Iv2_det, Iw2_det, based on the rotational position θ2.

The coordinate system of the d-axis and the q-axis (hereinafter, referred to as a dq-axis coordinate system) is a two-axis rotating coordinate system which rotates synchronizing with the rotational position θ2 (the magnetic pole position θ2) of the AC rotary machine (rotor). In detail, the dq-axis rotating coordinate system consists of the d-axis defined in the direction of the magnetic pole position θ2 (N pole of the magnet) of the rotor, and the q-axis defined in a direction advanced to the d-axis by 90 degrees in the electrical angle.

<Second Current Command Calculation Unit 902b>

The second current command calculation unit 902b calculates a second d-axis current command value Id2_ref and a second q-axis current command value Iq2_ref. As shown in the next equation, the second current command calculation unit 902b calculates a second torque command value T2_ref, by multiplying a sharing rate K2 of the second three-phase winding to the torque command value Tall for making the AC rotary machine output. The sharing rate of second system K2 is set to a value smaller than 1 (for example, 0.5).

$$T2\_ref = K2 \times Tall \qquad (2)$$

The second current command calculation unit 902b calculates the second d-axis current command value Id2_ref and the second q-axis current command value Iq2_ref according to the current vector control method, such as the maximum torque/current control, the magnetic flux weakening control, and the Id=0 control, based on the second torque command value T2_ref, the second DC voltage Vdc2, the rotational angle speed ω2, and the like. In the present embodiment, the torque command value Tall is transmitted from the external apparatus 50. The torque command value Tall may be the second torque command value T2_ref after sharing. The torque command value Tall may be calculated in the second current command calculation unit 902b.

<Second Voltage Command Calculation Unit 904b>

The second voltage command calculation unit 904b calculates a second d-axis voltage command value Vd2_ref and a second q-axis voltage command value Vq2_ref. In the present embodiment, the second voltage command calculation unit 904b performs a current feedback control which changes the second d-axis voltage command value Vd2_ref and the second q-axis voltage command value Vq2_ref, so that the second d-axis current detection value Id2_det approaches the second d-axis current command value after selection Id2_ref* by the second current command selection unit 903b described below, and the second q-axis current detection value Iq2_det approaches the second q-axis current command value after selection Iq2_ref* by the second current command selecting unit 903b. When calculating the d-axis and the q-axis voltage commands, the calculation for non-interfering between the d-axis current and the q-axis current of the second three-phase winding may be performed, and the calculation considering the interaction between the first three-phase winding and the second three-phase winding may be performed.

<Second Voltage Coordinate Conversion Unit 905b>

The second voltage coordinate conversion unit 905b converts the second d-axis voltage command value Vd2_ref and the second q-axis voltage command value Vq2_ref into a second three-phase voltage command values Vu2_ref, Vv2_ref, Vw2_ref, by performing a fixed coordinate conversion and a two-phase/three-phase conversion based on the rotational position θ2 (the magnetic pole position θ2). Various kinds of modulation may be added to the three-phase voltage command values.

<Second Voltage Application Unit 906b>

The second voltage application unit 906b turns on and off the plurality of switching devices of the second inverter 4b, by PWM control, based on the second three phase-voltage command values Vu2_ref, Vv2_ref, Vw2_ref. The second voltage application unit 906b generates a switching signal which turns on and off the switching device of each phase, by comparing each of the three-phase voltage command values and a carrier wave. The carrier wave is a triangular wave which has an amplitude of the second DC voltage detection value Vdc2_det, and oscillates at a carrier frequency. The second voltage application unit 906b turns on the switching signal when the voltage command value exceeds the carrier wave, and turns off the switching signal when the voltage command value is less than the carrier wave. The switching signal is transmitted as it is to the positive electrode side switching device 5b, and a switching signal obtained by reversing the switching signal is transmitted to the negative electrode side switching device 6b. Each switching signal is inputted into the gate terminal of each switching device of the second inverter 4b via the gate drive circuit, and each switching device is turned on or off.

1-6. First and Second Current Command Selection Unit 1-6-1. Setting Method of Current Command In the present embodiment, the first current command calculation unit 902a and the second current command calculation unit 902b are configured to set current commands as follows. The first current command calculation unit 902a is based on the first torque command value T1_ref, the first DC voltage Vdc1, and the rotational angle speed $\omega 1$. The second current command calculation unit 902b is based on the second torque command value T2_ref, the second DC voltage Vdc2, and the rotational angle speed $\omega 2$. In this way, only the based parameters differ with each other. Since the setting method itself is the same, the first current command calculation unit 902a is explained as a representative.

Figure 5:
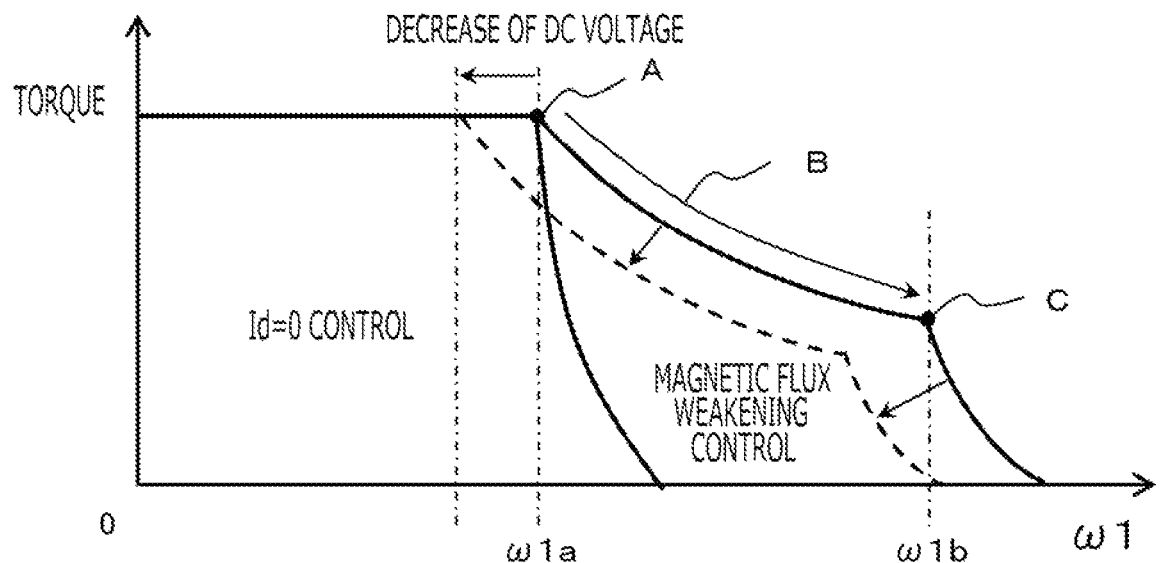
FIG. 5 is a figure for explaining setting of the current command according to Embodiment 1.

In the present embodiment, as shown in FIG. 5, the first current command calculation unit 902a switches and performs the Id=0 control and the magnetic flux weakening control, according to the rotational angle speed $\omega 1$ and the first torque command value T1_ref, and the first DC voltage Vdc1. Instead of the Id=0 control, the maximum torque/current control may be used. When the rotational angle speed $\omega 1$ is less than or equal to the base rotational angle speed $\omega 1a$, the maximum torque which can be output by the first three-phase winding is determined by restricting winding current to the rated current, and becomes a constant value with respect a change of the rotational angle speed $\omega 1$. When the rotational angle speed $\omega 1$ becomes larger than the base rotational angle speed $\omega 1a$, the maximum torque is determined by restricting the line voltage (induced voltage) of the first three-phase winding to the first DC voltage Vdc1, and decreases as the rotational angle speed $\omega 1$ increases.

In the present embodiment, in the magnetic flux weakening control, the d-axis current Id is lower-limited by a d-axis current minimum value Id_min, so that irreversible demagnetization of the permanent magnet does not occur due to the increase of the weakening magnetic flux by the decrease of the d-axis current Id from 0. Accordingly, when the rotational angle speed $\omega 1$ becomes larger than a d-axis current limitation rotational speed $\omega 1b$, the maximum torque is determined by restricting the line voltage of the first three-phase winding to the first DC voltage Vdc1 and restricting the d-axis current Id to the d-axis current minimum value Id_min, and decreases as the rotational angle speed $\omega 1$ increases.

The base rotational angle speed $\omega 1a$ is a rotational angle speed at which the maximum torque in the Id=0 control is determined by restricting the winding current to the rated current, and the line voltage (induced voltage) of winding starts to be limited by the first DC voltage Vdc1. Accordingly, according to the decrease of the first DC voltage Vdc1, the base rotational angle speed $\omega 1a$ decreases, and the maximum torque in the magnetic flux weakening control which is determined by restricting the line voltage (induced voltage) of winding to the first DC voltage Vdc1 also decreases.

Figure 6:
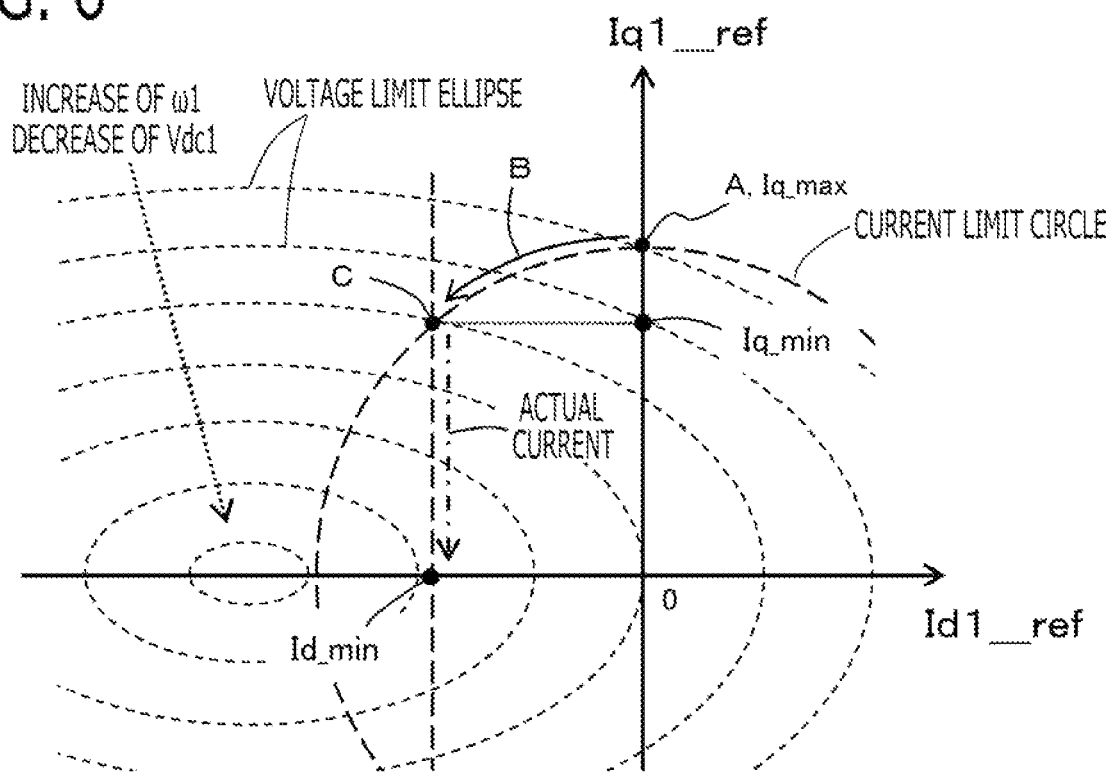
FIG. 6 is a figure for explaining setting of the current command according to Embodiment 1.

The first d-axis current command value Id1_ref and the first q-axis current command value Iq1_ref which are set in this way are explained in the dq-axis coordinate system shown in FIG. 6. The first d-axis and q-axis current command values Id1_ref, Iq1_ref at the maximum torque in the Id=0 control are set to an intersection point A between the line of the d-axis current Id=0 and the current limit circle by the rated current.

Then, the first d-axis and q-axis current command values Id1_ref, Iq1_ref at the maximum torque in the magnetic flux weakening control are set to an intersection point B between the current limit circle and the voltage limit ellipse (the constant induced voltage ellipse). As the rotational angle speed $\omega 1$ increases, the voltage limit ellipse is narrowed, and the first d-axis and q-axis current command values Id1_ref, Iq1_ref at the intersection point B decrease as shown by the arrow of FIG. 5.

Then, when the first d-axis current command value Id1_ref reaches the d-axis current minimum value Id_min for irreversible demagnetization suppression due to the increase of the rotational angle speed $\omega 1$, the first d-axis and q-axis current command values Id1_ref, Iq1_ref are set to an intersection point C between the current limit circle and the d-axis current minimum value Id_min. Even after that, since the voltage limit ellipse is narrowed as the rotational angle speed $\omega 1$ increases, the actual first d-axis current Id and q-axis current Iq become an intersection point between the voltage limit ellipse and the line of d-axis current minimum value Id_min, and decrease from the intersection point C to 0 along the line of d-axis current minimum value Id_min as the rotational angle speed $\omega 1$ increases.

The second current command calculation unit 902b sets the second d-axis current command value Id2_ref and the second q-axis current command value Iq2_ref, based on the rotational angle speed $\omega 2$, the second torque command value T2_ref, and the second DC voltage Vdc2, using the same method as the first current command calculation unit 902a.

1-6-2. Problem due to DC Voltage Difference between Systems The first and the second DC voltages Vdc1, Vdc2 may decrease lower than the rated voltage due to the ageing degradation or the decrease of charge amount of the DC power source. For example, when the second DC voltage Vdc2 decreases lower than the rated voltage, and the first DC voltage Vdc1 is maintained at the rated voltage, a voltage difference occurs between the first and the second DC voltages Vdc1, Vdc2. As shown in FIG. 5, as the DC voltage decreases, the base rotational angle speed $\omega 1a$ decreases, and the maximum torque in the magnetic flux weakening control decreases. Accordingly, a torque difference occurs between the maximum torque of the first three-phase winding, and the maximum torque of the second three-phase winding. When the torque difference occurs, oscillation and noise of high frequency are generated in the AC rotary machine 1.

Figure 7:
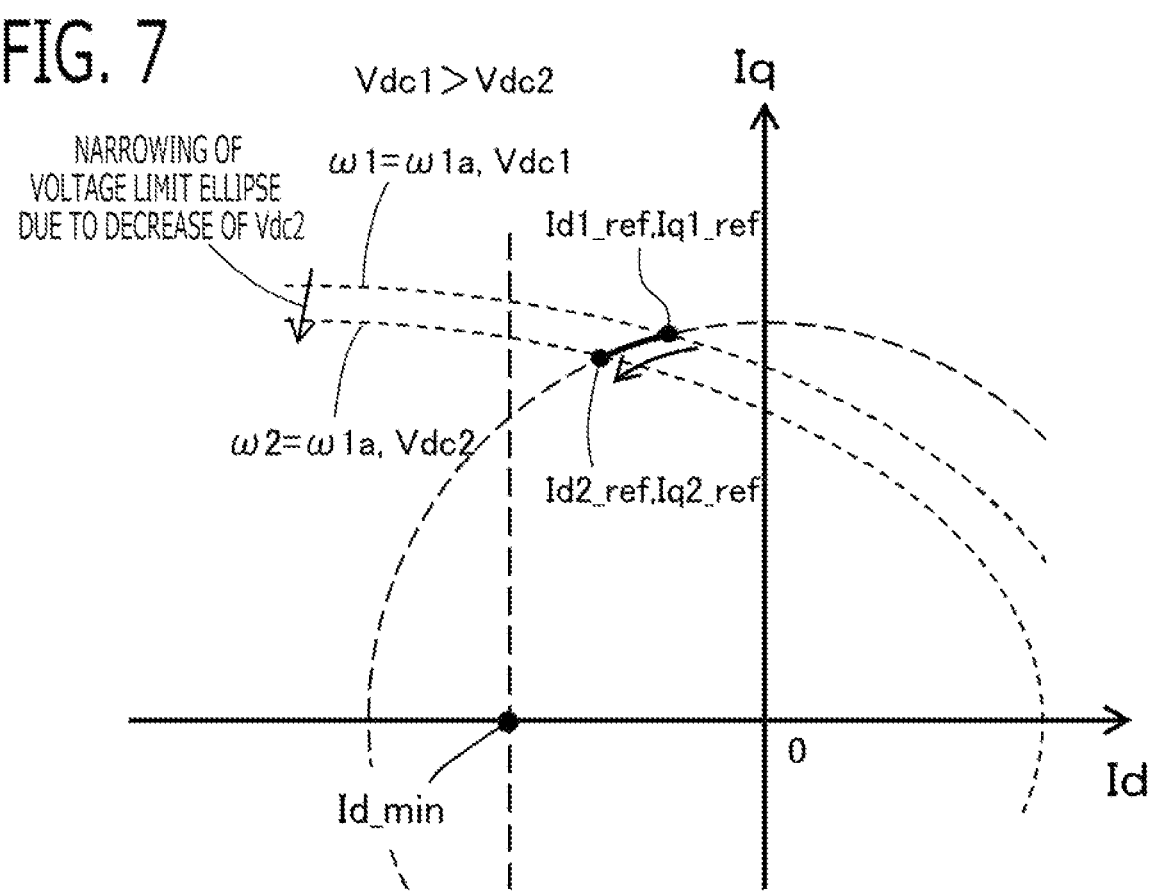
FIG. 7 is a figure for explaining setting of the current command according to Embodiment 1.
Figure 8:
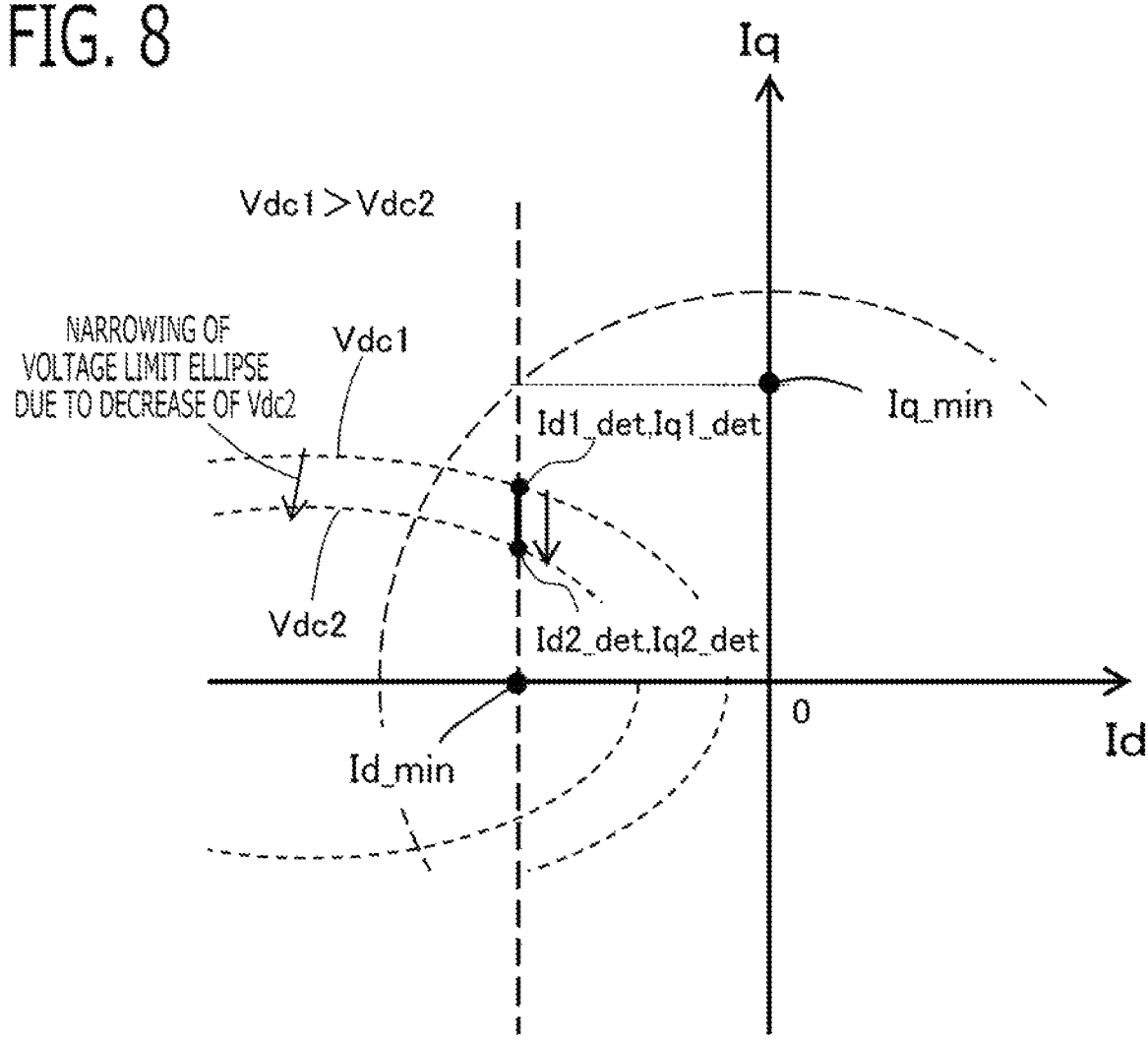
FIG. 8 is a figure for explaining setting of the current command according to Embodiment 1.

For example, as shown in FIG. 7, when the second DC voltage Vdc2 decreases lower than the rated voltage at outputting the maximum torque in the magnetic flux weakening control, the voltage limit ellipse is narrowed, and the second d-axis current command value Id2_ref and the second q-axis current command value Iq2_ref decrease lower than the first d-axis current command value Id1_ref and the first q-axis current command value Iq1_ref which are maintained at the rated voltage. And, as shown in FIG. 8, when the second DC voltage Vdc2 decreases lower than the rated voltage at outputting the maximum torque in the d-axis current minimum value limitation, the voltage limit ellipse is narrowed, and the second q-axis current detection value Iq2_det decreases lower than the first q-axis current detection value Iq1_det which is maintained at the rated voltage.

<Control Behavior of Comparative Example which is not Provided with Current Command Selection Unit>

Figure 9:
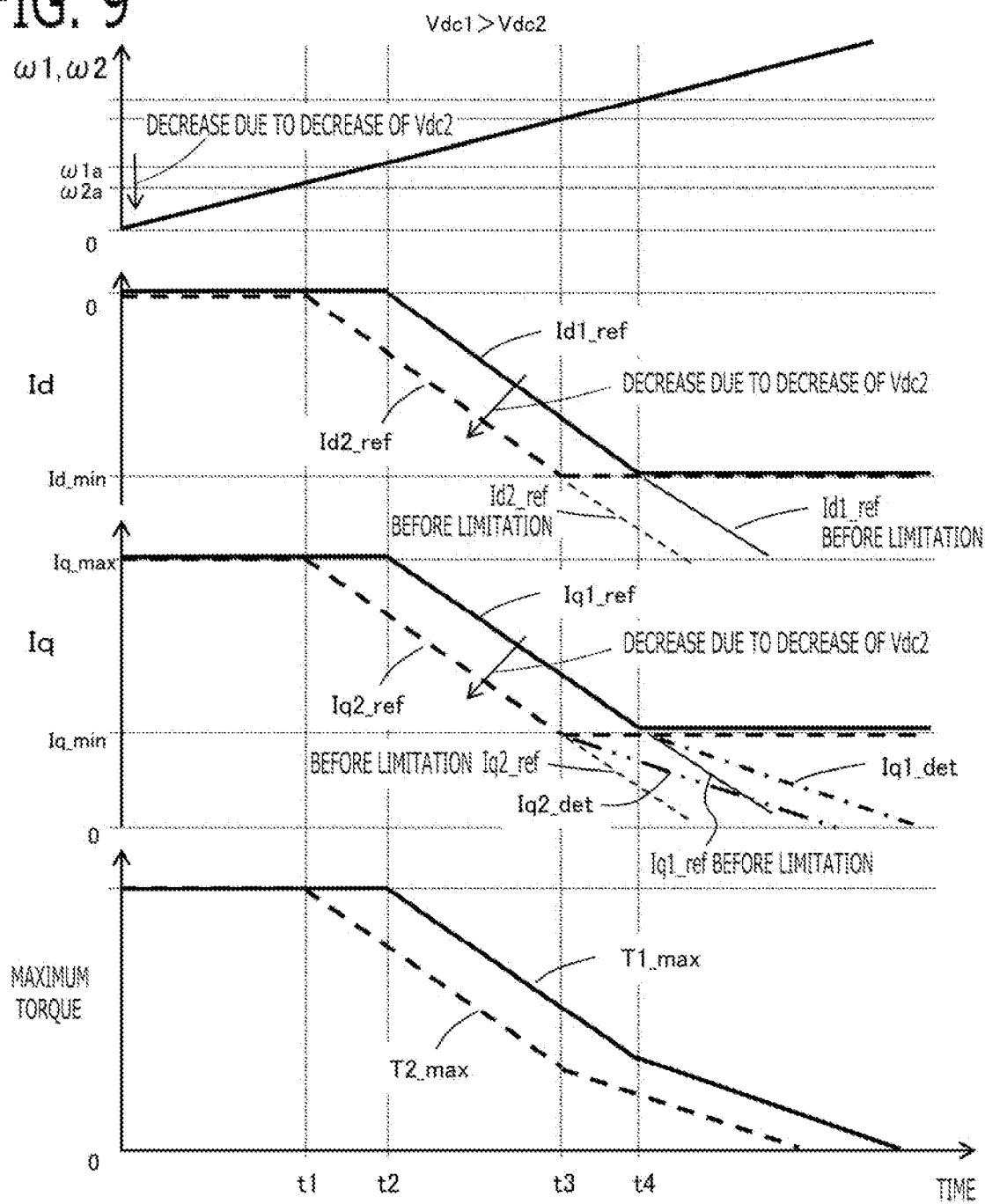
FIG. 9 is a time chart for explaining a control behavior according to the comparative example.

FIG. 9 shows the control behavior of the comparative example when the rotational angle speed is gradually increased from 0 in the state of making the first and the second three-phase winding output the maximum torque. In this example, the first DC voltage Vdc1 is maintained at the rated voltage, and the second DC voltage Vdc2 decreases lower than the rated voltage (Vdc1>Vdc2). Accordingly, the base rotational angle speed ω2a of the second three-phase winding becomes lower than the base rotational angle speed ω1a of the first three-phase winding.

In the first three-phase winding, at the time t2, the rotational angle speed reaches the base rotational angle speed ω1a of the first three-phase winding. On the other hand, in the second three-phase winding, due to the decrease of the base rotational angle speed ω2a, the rotational angle speed reaches the base rotational angle speed ω2a of the second three-phase winding at the time t1 earlier than the time t2.

In the period until the time t2 about the first three-phase winding, and in the period until the time t1 about the second three-phase winding, since the rotational angle speed is lower than the base rotational angle speed ω1a, ωa2 of each three-phase winding, the Id=0 control is performed. And, as shown in FIG. 5 and FIG. 6, the first and the second d-axis current command values Id1_ref, Id2_ref are set to 0; the first and the second q-axis current command values Iq1_ref, Iq2_ref are set to the maximum current Iq_max corresponding to the rated current; and the maximum torque T1_max of the first three-phase winding and the maximum torque T2_max of the second three-phase winding become constant. In this Id=0 control, due to the difference of the DC voltage between systems, the difference of the dq-axis currents and the difference of torque between systems do not occur.

In the period from the time t2 to the time t4 about the first three-phase winding, and in the period from the time t1 to the time t3 about the second three-phase winding, the magnetic flux weakening control is performed. And, as shown in FIG. 5 and FIG. 6, as the rotational angle speed increases, the first and the second d-axis current command values Id1_ref, Id2_ref decrease, the first and the second q-axis current command values Iq1_ref, Iq2_ref decrease, and the maximum torques T1_max, T2_max of the first and the second three-phase winding decrease.

In this time, as shown in FIG. 5 and FIG. 7, since the second DC voltage Vdc2 decreases, the current command values Id2_ref, Iq2_ref and the maximum torque T2_max of the second three-phase winding decrease in an offset manner, as compared with the current command values Id1_ref, Iq1_ref and the maximum torque T1_max of the first three-phase winding. Therefore, in the magnetic flux weakening control of this comparative example, due to the difference of DC voltage, the difference of the dq-axis currents and the difference of torque between systems occur, and oscillation and noise of high frequency are generated in the AC rotary machine 1.

In the first three-phase winding, at the time t4, the first d-axis current command value Id1_ref reaches the d-axis current minimum value Id_min, and is lower-limited. On the other hand, in the second three-phase winding, due to the offset decrease of the d-axis current command value, at the time t3 earlier than the time t4, the second d-axis current command value Id2_ref reaches the d-axis current minimum value Id_min, and is lower-limited.

In the period after the time t4 about the first three-phase winding, and in the period after the time t3 about the second three-phase winding, the d-axis current minimum value limitation in the magnetic flux weakening control is performed. And, as shown in FIG. 5 and FIG. 6, with respect to an increase in the rotational angle speed, the first and the second d-axis current command values Id1_ref, Id2_ref are set to the d-axis current minimum value Id_min, and the first and the second q-axis current command values Iq1_ref, Iq2_ref are also set to the q-axis current minimum value Iq_min. On the other hand, as the rotational angle speed increases, since the actual first and the actual second q-axis currents Iq1, Iq2 decrease, the maximum torque T1_max, T2_max of the first and the second three-phase winding decrease.

In this time, as shown in FIG. 5 and FIG. 8, since the second DC voltage Vdc2 decreases, the actual second q-axis current Iq2 and the maximum torque T2_max decrease in an offset manner, as compared with the actual first q-axis current Iq1 and the maximum torque T1_max. Therefore, in this d-axis current minimum value limitation, due to the difference of DC voltage, the difference of the q-axis current and the difference of torque between systems occur, and oscillation and noise of high frequency are generated in the AC rotary machine 1. An offset difference occurs also between the first d-axis current command value Id1_ref and the second d-axis current command value Id2_ref which are calculated by the magnetic flux weakening control, and are before being lower-limited by the d-axis current minimum value Id_min. An offset difference occurs also between the first q-axis current command value Iq1_ref and the second q-axis current command value Iq2_ref which are calculated by the magnetic flux weakening control, and are before being lower-limited by the d-axis current minimum value Id_min.

In this way, in the magnetic flux weakening control, and in the d-axis current minimum value limitation in the magnetic flux weakening control, due to the DC voltage difference between systems, the maximum torque difference between systems occurs, and the difference of the dq-axis current detection values and the difference of the dq-axis current commands occur.

In order to reduce the torque difference between systems due to the DC voltage difference between systems, the dq-axis currents of higher DC voltage may be adjusted with the dq-axis current of lower DC voltage. Due to narrowing of the voltage limit ellipse, the dq-axis currents of lower DC voltage cannot be adjusted with the dq-axis currents of higher DC voltage. Since the q-axis current is proportional to the torque, the q-axis current is more important than the d-axis current in order to reduce the torque difference.

1-6-3. Configuration of First and Second Current Command Selection Unit

<Selection of q-Axis Current Command According to DC Voltage Difference Between Systems>

Then, as shown in the next equation, when determining that the first DC voltage Vdc1 is less than or equal to the second DC voltage Vdc2, the first current command selecting unit 903a sets the first q-axis current command value Iq1_ref as the first q-axis current command value after selection Iq1_ref*. When determining that the first DC voltage Vdc1 is higher than the second DC voltage Vdc2, the first current command selecting unit 903a sets the second q-axis current detection value Iq2_det obtained from the second controller 9b by communication, as the first q-axis current command value after selection Iq1_ref*. Then, as mentioned above, the first voltage command calculation unit 904a changes the first q-axis voltage command value Vq1_ref so that the first q-axis current detection value Iq1_det approaches the first q-axis current command value after selection Iq1_ref*.

1) When determining that $Vdc1 \leq Vdc2$ $$Iq1\_ref^* = Iq1\_ref$$

2) When determining that $Vdc1 > Vdc2$ $$Iq1\_ref^* = Iq2\_det \quad (3)$$

And, as shown in the next equation, when determining that the second DC voltage Vdc2 is less than or equal to the first DC voltage Vdc1, the second current command selection unit 903b sets the second q-axis current command value Iq2_ref as the second q-axis current command value after selection Iq2_ref*. When determining that the second DC voltage Vdc2 is higher than the first DC voltage Vdc1, the second current command selection unit 903b sets the first q-axis current detection value Iq1_det obtained from the first controller 9a by communication, as the second q-axis current command value after selection Iq2_ref*. Then, as mentioned above, the second voltage command calculation unit 904b changes the second q-axis voltage command value Vq2_ref so that the second q-axis current detection value Iq2_det approaches the second q-axis current command value after selection Iq2_ref*.

1) When determining that $Vdc2 \leq Vdc1$ $$Iq2\_ref^* = Iq2\_ref$$

2) When determining that $Vdc2 > Vdc1$ $$Iq2\_ref^* = Iq1\_det \quad (4)$$

According to the above configuration, when the first DC voltage Vdc1 becomes higher than the second DC voltage Vdc2, since the second q-axis current detection value Iq2_det is set as the first q-axis current command value after selection Iq1_ref*, the first q-axis current can be lowered to the second q-axis current so that the first q-axis current does not become higher than the second q-axis current in the vicinity of the maximum torque in the magnetic flux weakening control. On the contrary, when the second DC voltage Vdc2 becomes higher than the first DC voltage Vdc1, since the first q-axis current detection value Iq1_det is set as the second q-axis current command value after selection Iq2_ref*, the second q-axis current can be lowered to the first q-axis current so that the second q-axis current does not become higher than the first q-axis current in the vicinity of the maximum torque in the magnetic flux weakening control. Since the q-axis current is proportional to the torque, it is possible to suppress occurrence of the torque difference between systems due to the difference of the DC voltage between systems.

<Selection of d-Axis Current Command According to DC Voltage Difference Between Systems>

In the present embodiment, as shown in the next equation, when determining that the first DC voltage Vdc1 is less than or equal to the second DC voltage Vdc2, the first current command selecting unit 903a sets the first d-axis current command value Id1_ref as the first d-axis current command value after selection Id1_ref*. When determining that the first DC voltage Vdc1 is higher than the second DC voltage Vdc2, the first current command selecting unit 903a sets the second d-axis current command value Id2_ref obtained from the second controller 9b by communication, as the first d-axis current command value after selection Id1_ref*. Then, as mentioned above, the first voltage command calculation unit 904a changes the first d-axis voltage command value Vd1_ref so that the first d-axis current detection value Id1_det approaches the first d-axis current command value after selection Id1_ref*.

1) When determining that $Vdc1 \leq Vdc2$ $$Id1\_ref^* = Id1\_ref$$

2) When determining that $Vdc1 > Vdc2$ $$Id1\_ref^* = Id2\_ref \quad (5)$$

And, as shown in the next equation, when determining that the second DC voltage Vdc2 is less than or equal to the first DC voltage Vdc1, the second current command selection unit 903b sets the second d-axis current command value Id2_ref as the second d-axis current command value after selection Id2_ref*. When determining that the second DC voltage Vdc2 is higher than the first DC voltage Vdc1, the second current command selection unit 903b sets the first d-axis current command value Id1_ref obtained from the first controller 9a by communication, as the second d-axis current command value after selection Id2_ref*. Then, as mentioned above, the second voltage command calculation unit 904b changes the second d-axis voltage command value Vd2_ref so that the second d-axis current detection value Id2_det approaches the second d-axis current command value after selection Id2_ref*.

1) When determining that $Vdc2 \leq Vdc1$ $$Id2\_ref^* = Id2\_ref$$

2) When determining that $Vdc2 > Vdc1$ $$Id2\_ref^* = Id1\_ref \quad (6)$$

According to the above configuration, when the first DC voltage Vdc1 becomes higher than the second DC voltage Vdc2, since the second d-axis current command value Id2_ref is set as the first d-axis current command value after selection Id1_ref*, the first d-axis current can be lowered to the second d-axis current so that the first d-axis current does not become higher than the second d-axis current in the vicinity of the maximum torque in the magnetic flux weakening control. On the contrary, when the second DC voltage Vdc2 becomes higher than the first DC voltage Vdc1, since the first d-axis current command value Id1_ref is set as the second d-axis current command value after selection Id2_ref*, the second d-axis current can be lowered to the first d-axis current so that the second d-axis current does not become higher than the first d-axis current in the vicinity of the maximum torque in the magnetic flux weakening control. Therefore, in addition to the q-axis current, since the difference of the d-axis current between systems can be reduced, it is possible to suppress more accurately occurrence of the torque difference between systems due to the difference of the DC voltage between systems.

<Determination of DC Voltage Difference Between Systems by d-Axis Current>

In the present embodiment, as shown in the next equation, when an absolute value of the first d-axis current command value Id1_ref is greater than or equal to an absolute value of the second d-axis current command value Id2_ref obtained from the second controller 9b by communication, the first current command selecting unit 903a determines that the first DC voltage Vdc1 is less than or equal to the second DC voltage Vdc2. When the absolute value of the first d-axis current command value Id1_ref is less than the absolute value of the second d-axis current command value Id2_ref obtained from the second controller 9b by communication, the first current command selecting unit 903a determines that the first DC voltage Vdc1 is higher than the second DC voltage Vdc2.

1) When $|Id1\_ref| \geq |Td2\_ref|$

Determining that $Vdc1 \leq Vdc2$

2) When $|Id1\_ref| < |Td2\_ref|$

Determining that $Vdc1 > Vdc2$ (7)

And, as shown in the next equation, when the absolute value of the second d-axis current command value Id2_ref is greater than or equal to the absolute value of the first d-axis current command value Id1_ref obtained from the first controller 9a by communication, the second current command selection unit 903b determines that the second DC voltage Vdc2 is less than or equal to the first DC voltage Vdc1. When the absolute value of the second d-axis current command value Id2_ref is less than the absolute value of the first d-axis current command value Id1_ref obtained from the first controller 9a by communication, the second current command selection unit 903b determines that the second DC voltage Vdc2 is higher than the first DC voltage Vdc1.

1) When $|Id2\_ref| \geq |Id1\_ref|$

Determining that $Vdc2 \leq Vdc1$

2) When $|Id2\_ref| < |Id1\_ref|$

Determining that $Vdc2 > Vdc1$ (8)

Like the present embodiment, when the first and the second d-axis current command values Id1_ref, Id2_ref are lower-limited by the d-axis current minimum value Id_min and both become the same values, in the equation (7) and the equation (8), instead of the first and the second d-axis current command values Id1_ref, Id2_ref, the first d-axis current command value and the second d-axis current command value which are calculated by the magnetic flux weakening control and are before being lower-limited by the d-axis current minimum value Id_min may be used.

According to the above configuration, since the DC voltage difference between systems can be determined using the first and the second d-axis current command values Id1_ref, Id2_ref used for setting of the first and the second d-axis current command values after selection Id1_ref*, Id2_ref*, the data communication quantity between the first controller 9a and the second controller 9b can be reduced.

<Control Behavior of Present Embodiment>

Figure 10:
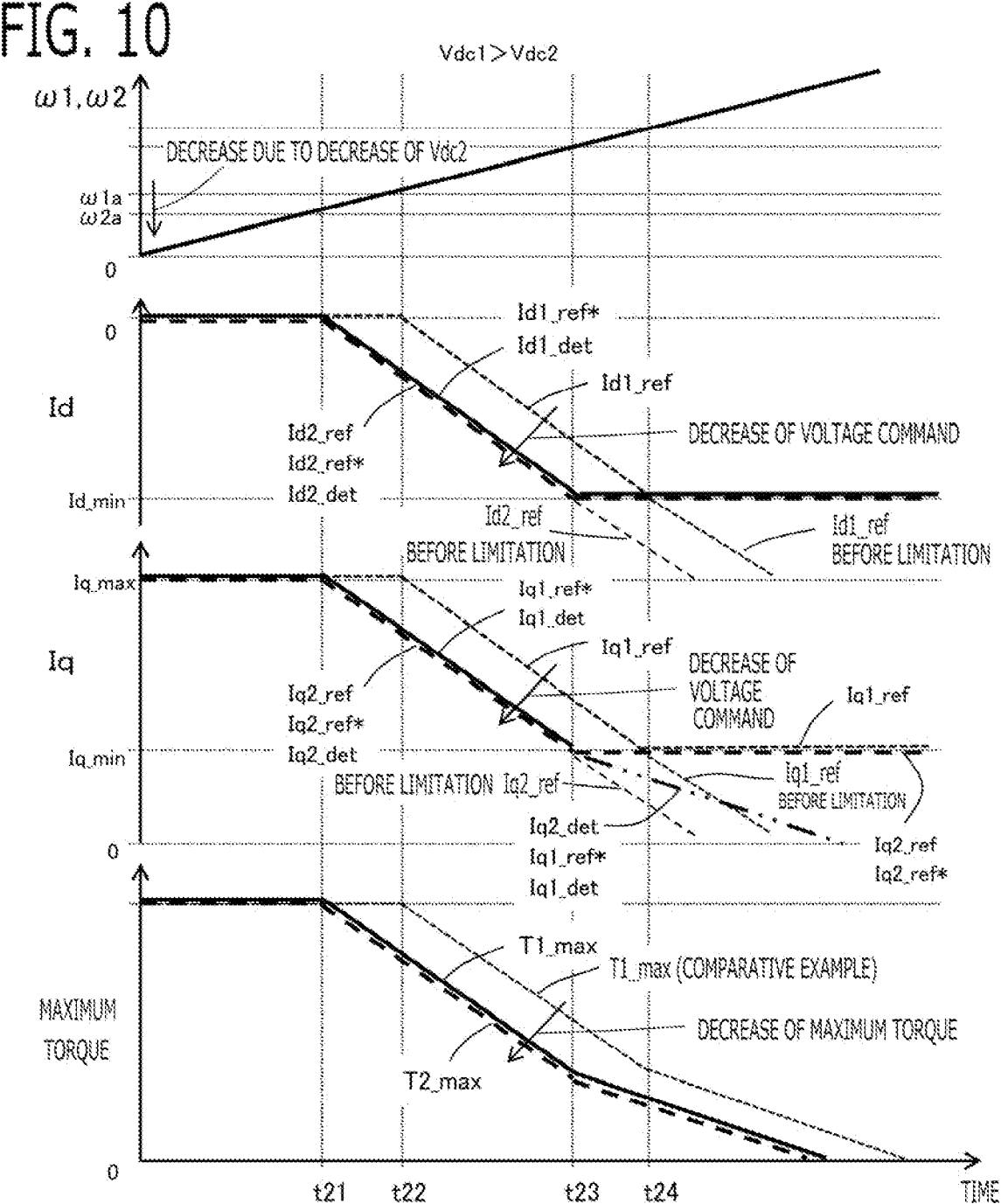
FIG. 10 is a time chart for explaining a control behavior according to Embodiment 1.

FIG. 10 shows the control behavior of the present embodiment when the rotational angle speed is gradually increased from 0 in the state of making the first and the second three-phase winding output the maximum torque. Also in this example, similar to the comparative example of FIG. 9, the first DC voltage Vdc1 is maintained at the rated voltage, and the second DC voltage Vdc2 decreases lower than the rated voltage (Vdc1>Vdc2). Accordingly, the base rotational angle speed ω2a of the second three-phase winding becomes lower than the base rotational angle speed ω1a of the first three-phase winding.

In the first three-phase winding, at the time t22, the rotational angle speed reaches the base rotational angle speed ω1a of the first three-phase winding. On the other hand, in the second three-phase winding, due to the decrease of the base rotational angle speed ω2a, the rotational angle speed reaches the base rotational angle speed ω2a of the second three-phase winding at the time t21 earlier than the time t22.

In the period unit the time t21, the Id=0 control is performed in both of the first three-phase winding and the second three-phase winding, and due to the difference of the DC voltage between systems, the difference of the dq-axis currents and the difference of torque between systems do not occur.

In the period from the time t22 to the time t24 about the first three-phase winding, and in the period from the time t21 to the time t23 about the second three-phase winding, the dq-axis voltage command values are calculated by the magnetic flux weakening control. Then, as shown in FIG. 5 and FIG. 7, since the second DC voltage Vdc2 becomes lower than the first DC voltage Vdc1, the absolute value of the second d-axis current command value Id2_ref becomes larger than the absolute value of the second d-axis current command value Id1_ref. Accordingly, the first and the second current command selection units 903a, 903b determine that the second DC voltage Vdc2 is less than or equal to the first DC voltage Vdc1, the second q-axis current detection value Iq2_det is set as the first q-axis current command value after selection Iq1_ref*, and the second d-axis current detection value Id2_det is set as the first d-axis current command value after selection Id1_ref*.

Accordingly, as compared with the comparative example of FIG. 9, the first q-axis current can be lowered to the second q-axis current, and the first d-axis current can be lowered to the second d-axis current. Therefore, the maximum torque T1_max of the first three-phase winding can be lowered to the maximum torque T2_max of the second three-phase winding, and the torque difference between systems can be reduced.

In the period after the time t24 about the first three-phase winding, and in the period after the time t23 about the second three-phase winding, each d-axis current command value calculated by the magnetic flux weakening control is lower-limited by the d-axis current minimum value Id_min, and the first and the second d-axis current command values Id1_ref, Id2_ref are set to the d-axis current minimum value Id_min. And, each q-axis current command value calculated by the magnetic flux weakening control is lower-limited by the q-axis current minimum value Iq_min, and the first and the second q-axis current command values Iq1_ref, Iq2_ref are set to the q-axis current minimum value Iq_min.

At this time, the absolute value of the second d-axis current command value which is calculated by the magnetic flux weakening control and is before being lower-limited by the d-axis and the q-axis current minimum values Id_min, Iq_min becomes larger than the absolute value of the first d-axis current command value before similar lower limitation. Accordingly, the first and the second current command selection units 903a, 903b determine that the second DC voltage Vdc2 is less than or equal to the first DC voltage Vdc1, the second q-axis current detection value Iq2_det is set as the first q-axis current command value after selection Iq1_ref*, and the second d-axis current command value Id2_ref is set as the first d-axis current command value after selection Id1_ref*.

Accordingly, as compared with the comparative example of FIG. 9, while maintaining the first d-axis current and the second d-axis current at the d-axis current minimum value Id_min, the first q-axis current detection value Iq1_det can be lowered to the second q-axis current detection value Iq2_det. Therefore, the maximum torque T1_max of the first three-phase winding can be lowered to the maximum torque T2_max of the second three-phase winding, and the torque difference between systems can be reduced.

In this way, even if the DC voltage difference between systems occurs, it is possible to suppress occurrence of the torque difference between systems over the whole region of the rotational angle speed, regardless of the Id=0 control and the magnetic flux weakening control.

2. Embodiment 2

Figure 11:
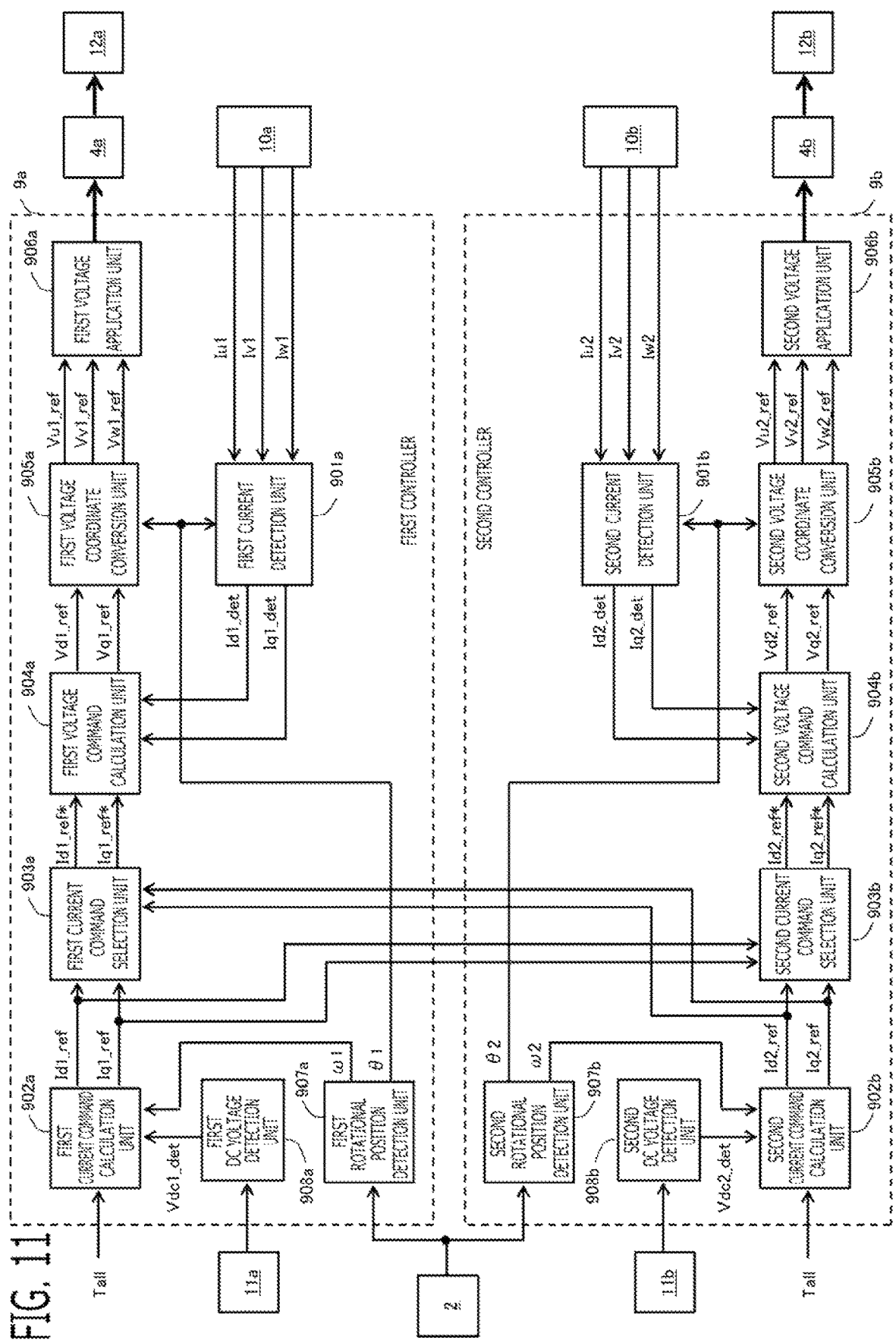
FIG. 11 is a block diagram of the first controller and the second controller according to Embodiment 2.

Next, the AC rotary machine 1 and the motor controller according to Embodiment 2 will be explained. The explanation for constituent parts the same as those in Embodiment 1 will be omitted. The basic configuration of the AC rotary machine 1 and the motor controller according to the present embodiment is the same as that of Embodiment 1. Embodiment 2 is different from Embodiment 1 in the processing of the first and the second current command selection units 903a, 903b. FIG. 11 shows the block diagram of the first and the second controllers 9a, 9b according to the present embodiment.

In the present embodiment, instead of the equation (3), as shown in the next equation, when determining that the first DC voltage Vdc1 is less than or equal to the second DC voltage Vdc2, the first current command selecting unit 903a sets the first q-axis current command value Iq1_ref as the first q-axis current command value after selection Iq1_ref*. When determining that the first DC voltage Vdc1 is higher than the second DC voltage Vdc2, the first current command selecting unit 903a sets the second q-axis current command value Iq2_ref obtained from the second controller 9b by communication, as the first q-axis current command value after selection Iq1_ref*. Then, as mentioned above, the first voltage command calculation unit 904a changes the first q-axis voltage command value Vq1_ref so that the first q-axis current detection value Iq1_det approaches the first q-axis current command value after selection Iq1_ref*.

1) When determining that $Vdc1<=Vdc2$ $Iq1\_ref^*=Iq1\_ref$

2) When determining that $Vdc1>Vdc2$ $$Iq1\_ref^*=Iq2\_ref \quad (9)$$

And, instead of the equation (4), as shown in the next equation, when determining that the second DC voltage Vdc2 is less than or equal to the first DC voltage Vdc1, the second current command selection unit 903b sets the second q-axis current command value Iq2_ref as the second q-axis current command value after selection Iq2_ref*. When determining that the second DC voltage Vdc2 is higher than the first DC voltage Vdc1, the second current command selection unit 903b sets the first q-axis current command value Iq1_ref obtained from the first controller 9a by communication, as the second q-axis current command value after selection Iq2_ref*. Then, as mentioned above, the second voltage command calculation unit 904b changes the second q-axis voltage command value Vq2_ref so that the second q-axis current detection value Iq2_det approaches the second q-axis current command value after selection Iq2_ref*.

1) When determining that $Vdc2<=Vdc1$ $Iq2\_ref^*=Iq2\_ref$

2) When determining that $Vdc2>Vdc1$ $$Iq2\_ref^*=Iq1\_ref \quad (10)$$

Like the present embodiment, when the first and the second q-axis current command values Iq1_ref, Iq2_ref are lower-limited by the q-axis current minimum value Iq_min corresponding to the d-axis current minimum value Id_min and both become the same values, in the equation (9) and 2) of the equation (10), instead of the first and the second q-axis current command values Iq1_ref, Iq2_ref, the first q-axis current command value and the second q-axis current command value which are calculated by the magnetic flux weakening control and are before being lower-limited by the q-axis current minimum value Iq_min may be used.

According to the above configuration, when the first DC voltage Vdc1 becomes higher than the second DC voltage Vdc2, since the second q-axis current command value Iq2_ref is set as the first q-axis current command value after selection Iq1_ref*, the first q-axis current can be lowered to the second q-axis current so that the first q-axis current does not become higher than the second q-axis current in the vicinity of the maximum torque in the magnetic flux weakening control. On the contrary, when the second DC voltage Vdc2 becomes higher than the first DC voltage Vdc1, since the first q-axis current command value Iq1_ref is set as the second q-axis current command value after selection Iq2_ref*, the second q-axis current can be lowered to the first q-axis current so that the second q-axis current does not become higher than the first q-axis current in the vicinity of the maximum torque in the magnetic flux weakening control. Since the q-axis current is proportional to the torque, it is possible to suppress occurrence of the torque difference between systems due to the difference of the DC voltage between systems.

3. Embodiment 3

Figure 12:
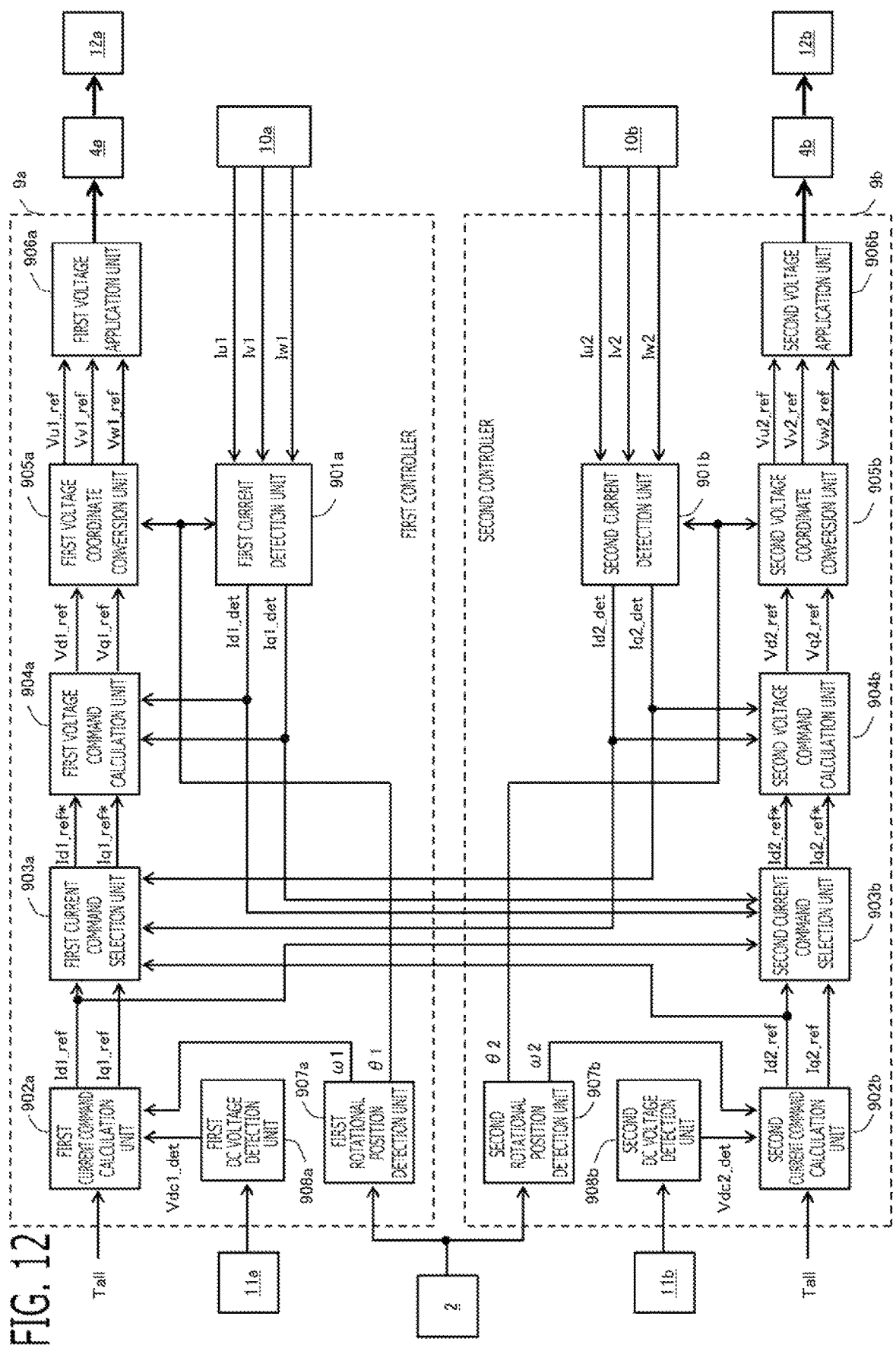
FIG. 12 is a block diagram of the first controller and the second controller according to Embodiment 3.

Next, the AC rotary machine 1 and the motor controller according to Embodiment 3 will be explained. The explanation for constituent parts the same as those in Embodiment 1 will be omitted. The basic configuration of the AC rotary machine 1 and the motor controller according to the present embodiment is the same as that of Embodiment 1. Embodiment 3 is different from Embodiment 1 in the processing of the first and the second current command selection units 903a, 903b. FIG. 12 shows the block diagram of the first and the second controllers 9a, 9b according to the present embodiment.

In the present embodiment, instead of the equation (5), as shown in the next equation, when determining that the first DC voltage Vdc1 is less than or equal to the second DC voltage Vdc2, the first current command selecting unit 903a sets the first d-axis current command value Id1_ref as the first d-axis current command value after selection Id1_ref*. When determining that the first DC voltage Vdc1 is higher than the second DC voltage Vdc2, the first current command selecting unit 903a sets the second d-axis current detection value Id2_det obtained from the second controller 9b by communication, as the first d-axis current command value after selection Id1_ref*. Then, as mentioned above, the first voltage command calculation unit 904a changes the first d-axis voltage command value Vd1_ref so that the first d-axis current detection value Id1_det approaches the first d-axis current command value after selection Id1_ref*.

1) When determining that $Vdc1 \leq Vdc2$ $Id1\_ref^* = Id1\_ref$

2) When determining that $Vdc1 > Vdc2$ $$Id1\ ref^* = Id2\_det \quad (11)$$

Instead of the equation (6), as shown in the next equation, when determining that the second DC voltage Vdc2 is less than or equal to the first DC voltage Vdc1, the second current command selection unit 903b sets the second d-axis current command value Id2_ref as the second d-axis current command value after selection Id2_ref*. When determining that the second DC voltage Vdc2 is higher than the first DC voltage Vdc1, the second current command selection unit 903b sets the first d-axis current detection value Id1_det obtained from the first controller 9a by communication, as the second d-axis current command value after selection Id2_ref*. Then, as mentioned above, the second voltage command calculation unit 904b changes the second d-axis voltage command value Vd2_ref so that the second d-axis current detection value Id2_det approaches the second d-axis current command value after selection Id2_ref*.

1) When determining that $Vdc2 \leq Vdc1$ $Id2\_ref^* = Id2\_ref$

2) When determining that $Vdc2 > Vdc1$ $$Id2\ ref^* = Id1\ det \quad (12)$$

According to the above configuration, when the first DC voltage Vdc1 becomes higher than the second DC voltage Vdc2, since the second d-axis current detection value Id2_det is set to the first d-axis current command value after selection Id1_ref*, the first d-axis current can be lowered to the second d-axis current so that the first d-axis current does not become higher than the second d-axis current in the vicinity of the maximum torque in the magnetic flux weakening control. On the contrary, when the second DC voltage Vdc2 becomes higher than the first DC voltage Vdc1, since the first d-axis current detection value Id1_det is set as the second d-axis current command value after selection Id2_ref*, the second d-axis current can be lowered to the first d-axis current so that the second d-axis current does not become higher than the first d-axis current in the vicinity of the maximum torque in the magnetic flux weakening control. Therefore, in addition to the q-axis current, since the difference of the d-axis current between systems can be reduced, it is possible to suppress more accurately occurrence of the torque difference between systems due to the difference of the DC voltage between systems.

4. Embodiment 4

Next, the AC rotary machine 1 and the motor controller according to Embodiment 4 will be explained. The explanation for constituent parts the same as those in Embodiment 2 will be omitted. The basic configuration of the AC rotary machine 1 and the motor controller according to the present embodiment is the same as that of Embodiment 2. Embodiment 4 is different from Embodiment 1 in the processing of the first and the second current command selection units 903a, 903b. The block diagram of the first and the second controllers 9a, 9b according to the present embodiment becomes the same as FIG. 11 of Embodiment 2.

In the present embodiment, instead of the equation (7), as shown in the next equation, when the absolute value of the first q-axis current command value Iq1_ref is greater than or equal to the absolute value of the second q-axis current command value Iq2_ref obtained from the second controller 9b by communication, the first current command selecting unit 903a determines that the first DC voltage Vdc1 is higher than the second DC voltage Vdc2. When the absolute value of the first q-axis current command value Iq1_ref is less than the absolute value of the second q-axis current command value Iq2_ref obtained from the second controller 9b by communication, the first current command selecting unit 903a determines that the first DC voltage Vdc1 is less than or equal to the second DC voltage Vdc2.

1) When $|Iq1\_ref| \geq |Iq2\_ref|$

Determining that $Vdc1 > Vdc2$

2) When $|Id1\_ref| < |Id2\_ref|$ $$\text{Determining that } Vdc1 \leq Vdc2 \quad (13)$$

And, instead of the equation (8), as shown in the next equation, when the absolute value of the second q-axis current command value Iq2_ref is greater than or equal to the absolute value of the first q-axis current command value Iq1_ref obtained from the first controller 9a by communication, the second current command selection unit 903b determines that the second DC voltage Vdc2 is higher than the first DC voltage Vdc1. When the absolute value of the second q-axis current command value Iq2_ref is less than the absolute value of the first q-axis current command value Iq1_ref obtained from the first controller 9a by communication, the second current command selection unit 903b determines that the second DC voltage Vdc2 is less than or equal to the first DC voltage Vdc1.

1) When $|Iq2\_ref| \geq |Iq1\_ref|$

Determining that $Vdc2 > Vdc1$

2) When $|Iq2\_ref| < |Iq1\_ref|$ $$\text{Determining that } Vdc2 \leq Vdc1 \quad (14)$$

Like the present embodiment, when the first and the second q-axis current command values Iq1_ref, Iq2_ref are lower-limited by the q-axis current minimum value Iq_min corresponding to the d-axis current minimum value Id_min and both become the same values, in the equation (9) and the equation (10), instead of the first and the second q-axis current command values Iq1_ref, Iq2_ref, the first q-axis current command value and the second q-axis current command value which are calculated by the magnetic flux weakening control and are before being lower-limited by the q-axis current minimum value Iq_min may be used.

5. Embodiment 5

Figure 13:
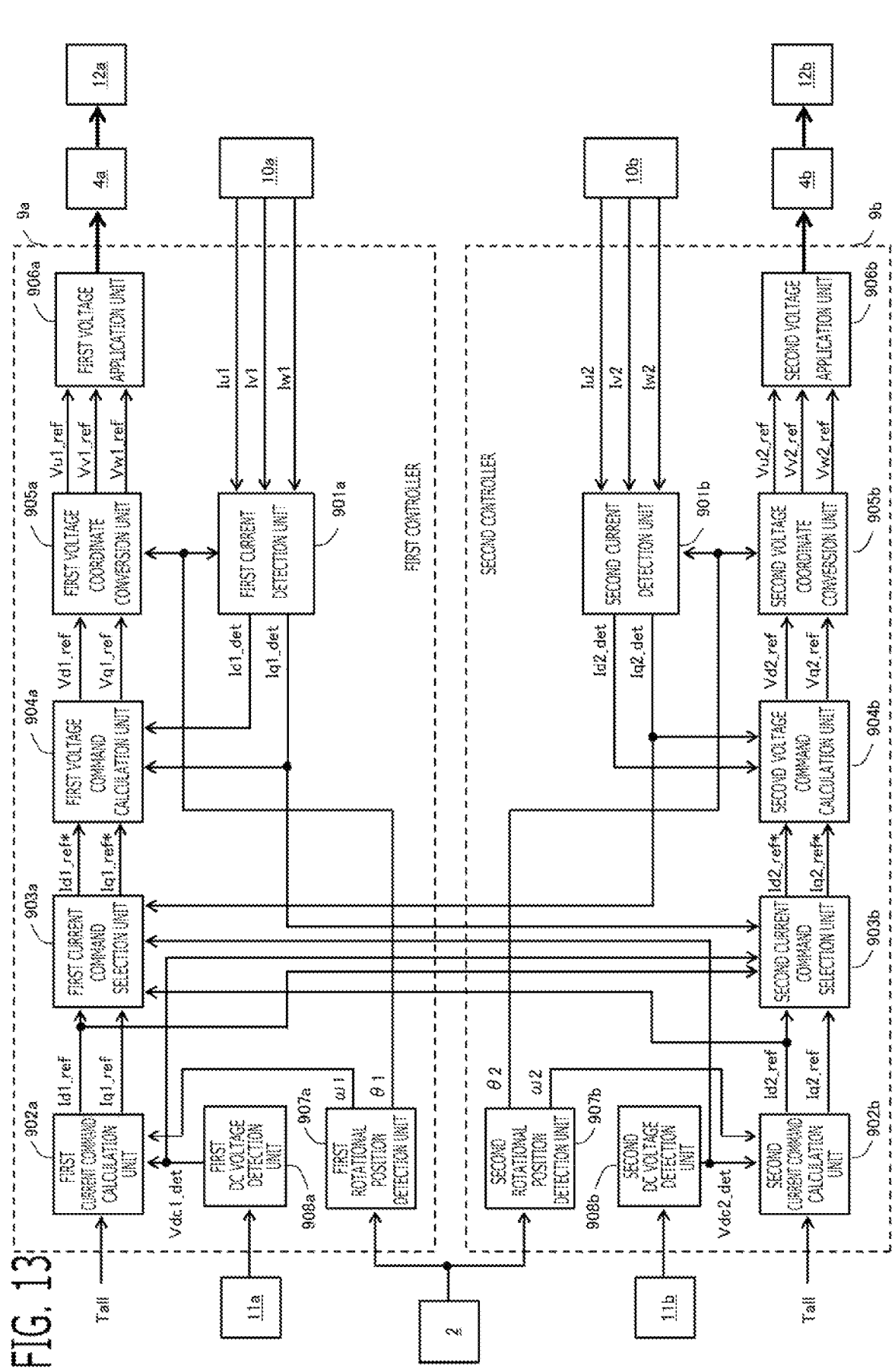
FIG. 13 is a block diagram of the first controller and the second controller according to Embodiment 5.

Next, the AC rotary machine 1 and the motor controller according to Embodiment 2 will be explained. The explanation for constituent parts the same as those in Embodiment 1 will be omitted. The basic configuration of the AC rotary machine 1 and the motor controller according to the present embodiment is the same as that of Embodiment 1. Embodiment 5 is different from Embodiment 1 in the determination method of the magnitude relation between the first DC voltage Vdc1 and the second DC voltage Vdc2 in the first and the second current command selection units 903a, 903b. FIG. 13 shows the block diagram of the first and the second controllers 9a, 9b according to the present embodiment.

In the present embodiment, instead of the equation (7), as shown in the next equation, when the first DC voltage detection value Vdc1_det is less than or equal to the second DC voltage detection value Vdc2_det obtained from the second controller 9b by communication, the first current command selecting unit 903a determines that the first DC voltage Vdc1 is less than or equal to the second DC voltage Vdc2. When the first DC voltage detection value Vdc1_det is higher than the second DC voltage detection value Vdc2_det obtained from the second controller 9b by communication, the first current command selecting unit 903a determines that the first DC voltage Vdc1 is higher than the second DC voltage Vdc2.

1) When $Vdc1\_det <= Vdc2\_det$

Determining that $Vdc1 <= Vdc2$

2) When $Vdc1\_det > Vdc2\_det$

Determining that $Vdc1 > Vdc2$ (15)

Instead of the equation (8), as shown in the next equation, when the second DC voltage detection value Vdc2_det is less than or equal to the first DC voltage detection value Vdc1_det obtained from the first controller 9a by communication, the second current command selection unit 903b determines that the second DC voltage Vdc2 is less than or equal to the first DC voltage Vdc1. When the second DC voltage detection value Vdc2_det is higher than the first DC voltage detection value Vdc1_det obtained from the first controller 9a by communication, the second current command selection unit 903b determines that the second DC voltage Vdc2 is higher than the first DC voltage Vdc1.

1) When $Vdc2\_det <= Vdc1\_det$

Determining that $Vdc2 <= Vdc1$

2) When $Vdc2\_det > Vdc1\_det$

Determining that $Vdc2 > Vdc1$ (16)

According to the above configuration, since the DC voltage difference between systems can be directly determined using the DC voltage detection value obtained by communication between controllers, the determination accuracy can be secured.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned embodiments, there was explained the case where in the magnetic flux weakening control, the d-axis current command value is lower-limited by the d-axis current minimum value Id_min. However, the d-axis current command value may not be lower-limited by the d-axis current minimum value Id_min.

(2) In each of the above-mentioned embodiments, there was explained the case where the Id=0 control is performed. However, instead of the Id=0 control, other vector control, such as the maximum torque/current control, may be performed.

(3) Embodiments 1 to 5 may be combined arbitrarily and performed.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC rotary machine, 3a: First DC power source, 3b: Second DC power source, 4a: First inverter, 4b: Second inverter, 9a: First controller, 9b: Second controller, 10a: First current detector, 10b: Second current detector, Id1_det: First d-axis current detection value, Id1_ref: First d-axis current command value, Id2_det: Second d-axis current detection value, Id2_ref: Second d-axis current command value, Iq1_det: First q-axis current detection value, Iq1_ref: First q-axis current command value, Iq2_det: Second q-axis current detection value, Iq2_ref: Second q-axis current command value, Vdc1: First DC voltage, Vdc1_det: First DC voltage detection value, Vdc2: Second DC voltage, Vdc2_det: Second DC voltage detection value, Vd1_ref: First d-axis voltage command value, Vd2_ref: Second d-axis voltage command value, Vq1_ref: First q-axis voltage command value, Vq2_ref: Second q-axis voltage command value

What is claimed is:
1. A motor controller that controls an AC rotary machine which has a first three-phase winding and a second three-phase winding, the motor controller comprising:
a first inverter that applies a first DC voltage of a first DC power source to the first three-phase winding;
a first current detector that detects a current which flows through the first three-phase winding;
a first controller that calculates a first d-axis current detection value and a first q-axis current detection value which are expressed a current detection value of the first three-phase winding detected by the first current detector in a coordinate system of a d-axis and a q-axis which rotates synchronizing with a rotational position of the AC rotary machine; calculates a first d-axis current command value and a first q-axis current command value; calculates a first d-axis voltage command value and a first q-axis voltage command value; and controls the first inverter based on the first d-axis voltage command value and the first q-axis voltage command value;
a second inverter that applies a second DC voltage of a second DC power source to the second three-phase winding;

a second current detector that detects a current which flows through the second three-phase winding; and
a second controller that calculates a second d-axis current detection value and a second q-axis current detection value which are expressed a current detection value of the second three-phase winding detected by the second current detector in the coordinate system of the d-axis and the q-axis; calculates a second d-axis current command value and a second q-axis current command value; calculates a second d-axis voltage command value and a second q-axis voltage command value; and controls the second inverter based on the second d-axis voltage command value and the second q-axis voltage command value,
wherein when determining that the first DC voltage is less than or equal to the second DC voltage, the first controller changes the first q-axis voltage command value so that the first q-axis current detection value approaches the first q-axis current command value, and
when determining that the first DC voltage is higher than the second DC voltage, the first controller changes the first q-axis voltage command value so that the first q-axis current detection value approach the second q-axis current detection value or the second q-axis current command value which are obtained from the second controller by communication,
wherein when determining that the second DC voltage is less than or equal to the first DC voltage, the second controller changes the second q-axis voltage command value so that the second q-axis current detection value approaches the second q-axis current command value, and
when determining that the second DC voltage is higher than the first DC voltage, the second controller changes the second q-axis voltage command value so that the second q-axis current detection value approaches the first q-axis current detection value or the first q-axis current command value which are obtained from the first controller by communication.

2. The motor controller according to claim 1,
wherein when determining that the first DC voltage is less than or equal to the second DC voltage, the first controller changes the first d-axis voltage command value so that the first d-axis current detection value approaches the first d-axis current command value, and
when determining that the first DC voltage is higher than the second DC voltage, the first controller changes the first d-axis voltage command value so that the first d-axis current detection value approaches the second d-axis current detection value or the second d-axis current command value which are obtained from the second controller by communication, and
wherein when determining that the second DC voltage is less than or equal to the first DC voltage, the second controller changes the second d-axis voltage command value so that the second d-axis current detection value approaches the second d-axis current command value, and
when determining that the second DC voltage is higher than the first DC voltage, the second controller changes the second q-axis voltage command value so that the second d-axis current detection value approaches the first d-axis current detection value or the first d-axis current command value which are obtained from the first controller by communication.

3. The motor controller according to claim 1,
wherein when an absolute value of the first d-axis current command value is greater than or equal to an absolute value of the second d-axis current command value obtained from the second controller by communication, the first controller determines that the first DC voltage is less than or equal to the second DC voltage, and
when an absolute value of the first d-axis current command value is smaller than an absolute value of the second d-axis current command value obtained from the second controller by communication, the first controller determines that the first DC voltage is higher than the second DC voltage, and
wherein when an absolute value of the second d-axis current command value is greater than or equal to an absolute value of the first d-axis current command value obtained from the first controller by communication, the second controller determines that the second DC voltage is less than or equal to the first DC voltage, and
when an absolute value of the second d-axis current command value is smaller than an absolute value of the first d-axis current command value obtained from the first controller by communication, the second controller determines that the second DC voltage is higher than the first DC voltage.

4. The motor controller according to claim 1,
wherein when an absolute value of the first q-axis current command value is greater than or equal to an absolute value of the second q-axis current command value obtained from the second controller by communication, the first controller determines that the first DC voltage is higher than the second DC voltage, and
when an absolute value of the first q-axis current command value is smaller than an absolute value of the second q-axis current command value obtained from the second controller by communication, the first controller determines that the first DC voltage is less than or equal to the second DC voltage, and
wherein when an absolute value of the second q-axis current command value is greater than or equal to an absolute value of the first q-axis current command value obtained from the first controller by communication, the second controller determines that the second DC voltage is higher than the first DC voltage, and
when an absolute value of the second q-axis current command value is smaller than an absolute value of the first q-axis current command value obtained from the first controller by communication, the second controller determines that the second DC voltage is less than or equal to the first DC voltage.

5. The motor controller according to claim 1,
wherein when the first DC voltage is less than or equal to the second DC voltage obtained from the second controller by communication, the first controller determines that the first DC voltage is less than or equal to the second DC voltage, and
when the first DC voltage is smaller than the second DC voltage obtained from the second controller by communication, the first controller determines that the first DC voltage is higher than the second DC voltage, and
wherein when the second DC voltage is less than or equal to the first DC voltage obtained from the first controller by communication, the second controller determines that the second DC voltage is less than or equal to the first DC voltage, and when the second DC voltage is higher than the first DC voltage obtained from the first controller by communication, the second controller determines that the second DC voltage is higher than the first DC voltage.

6. The motor controller according to claim 2,
wherein when an absolute value of the first d-axis current command value is greater than or equal to an absolute value of the second d-axis current command value obtained from the second controller by communication, the first controller determines that the first DC voltage is less than or equal to the second DC voltage, and
when an absolute value of the first d-axis current command value is smaller than an absolute value of the second d-axis current command value obtained from the second controller by communication, the first controller determines that the first DC voltage is higher than the second DC voltage, and
wherein when an absolute value of the second d-axis current command value is greater than or equal to an absolute value of the first d-axis current command value obtained from the first controller by communication, the second controller determines that the second DC voltage is less than or equal to the first DC voltage, and
when an absolute value of the second d-axis current command value is smaller than an absolute value of the first d-axis current command value obtained from the first controller by communication, the second controller determines that the second DC voltage is higher than the first DC voltage.

7. The motor controller according to claim 2,
wherein when an absolute value of the first q-axis current command value is greater than or equal to an absolute value of the second q-axis current command value obtained from the second controller by communication, the first controller determines that the first DC voltage is higher than the second DC voltage, and
when an absolute value of the first q-axis current command value is smaller than an absolute value of the second q-axis current command value obtained from the second controller by communication, the first controller determines that the first DC voltage is less than or equal to the second DC voltage, and
wherein when an absolute value of the second q-axis current command value is greater than or equal to an absolute value of the first q-axis current command value obtained from the first controller by communication, the second controller determines that the second DC voltage is higher than the first DC voltage, and
when an absolute value of the second q-axis current command value is smaller than an absolute value of the first q-axis current command value obtained from the first controller by communication, the second controller determines that the second DC voltage is less than or equal to the first DC voltage.

8. The motor controller according to claim 2,
wherein when the first DC voltage is less than or equal to the second DC voltage obtained from the second controller by communication, the first controller determines that the first DC voltage is less than or equal to the second DC voltage, and
when the first DC voltage is smaller than the second DC voltage obtained from the second controller by communication, the first controller determines that the first DC voltage is higher than the second DC voltage, and
wherein when the second DC voltage is less than or equal to the first DC voltage obtained from the first controller by communication, the second controller determines that the second DC voltage is less than or equal to the first DC voltage, and
when the second DC voltage is higher than the first DC voltage obtained from the first controller by communication, the second controller determines that the second DC voltage is higher than the first DC voltage.

* * * * *